US009536284B2

(12) United States Patent
Liege et al.

(10) Patent No.: US 9,536,284 B2
(45) Date of Patent: *Jan. 3, 2017

(54) METHOD AND SYSTEM FOR MODIFYING IMAGE QUALITY OF AN IMAGE

(71) Applicant: DxO Labs, Boulogne (FR)

(72) Inventors: Bruno Liege, Boulogne (FR); Frederic Guichard, Paris (FR); Jean-Marc Lavest, Clermont-Ferrand (FR)

(73) Assignee: DxO Labs, Boulogne (FR)

( * ) Notice: Subject to any disclaimer, the term of this patent is extended or adjusted under 35 U.S.C. 154(b) by 158 days.

This patent is subject to a terminal disclaimer.

(21) Appl. No.: 14/021,235

(22) Filed: Sep. 9, 2013

(65) Prior Publication Data
US 2014/0099042 A1  Apr. 10, 2014

Related U.S. Application Data

(60) Continuation of application No. 12/838,198, filed on Jul. 16, 2010, now Pat. No. 8,559,743, which is a
(Continued)

(30) Foreign Application Priority Data

Jul. 12, 2001 (FR) ...................................... 01 09291
Jul. 12, 2001 (FR) ...................................... 01 09292

(51) Int. Cl.
*G06K 9/40* (2006.01)
*G06T 5/00* (2006.01)
(Continued)

(52) U.S. Cl.
CPC ............... *G06T 5/00* (2013.01); *G06T 1/0007* (2013.01); *G06T 3/0056* (2013.01); *G06T 5/002* (2013.01);
(Continued)

(58) Field of Classification Search
CPC ............ H04N 1/00002; H04N 1/00005; H04N 1/00007; H04N 1/00026; H04N 1/00045; H04N 1/0005; H04N 1/00066; H04N 1/00068; H04N 1/00071; H04N 1/00962; H04N 1/0097; H04N 1/00973; H04N 1/387; H04N 1/40093; H04N 1/409; G06T 3/00; G06T 3/0056; G06T 5/00; G06T 5/001; G06T 5/002; G06T 5/003; G06T 5/006; G06T 5/007; G06T 5/009
(Continued)

(56) References Cited

U.S. PATENT DOCUMENTS 5,157,497 A * 10/1992 Topper ................. H04N 5/3572
348/251
5,606,365 A * 2/1997 Maurinus et al. ......... 348/222.1
(Continued)

FOREIGN PATENT DOCUMENTS

EP  647 921   4/1995
EP  686 945   12/1995
(Continued)

OTHER PUBLICATIONS

Mikio Watanabe et al., "An Image Data File Format for Digital Still Camera", Final Program and Advance Printing of Papers, Annual Conference, Imaging on the Information Superhighway, pp. 421-424, 1995.
(Continued)

*Primary Examiner* — Eric Rush
(74) *Attorney, Agent, or Firm* — Andrews Kurth Kenyon LLP

(57) ABSTRACT

A method and a system are described where the quality of an image can be modified, using formatted information related to the defects of the appliances of the chain of appliances.
(Continued)

The method may include compiling directories of sources of formatted information related to the said appliances, searching automatically for this formatted information related to the appliances of the said chain of appliances, modifying the said image automatically by image-processing software or components by taking into account the formatted information. Additionally, the formatted information may be modified as a function of variable characteristics of the image to be processed and of the chain of appliances. Thus, it is possible to process the images derived from appliances that may be of diverse origins and that have been commercialized gradually over time, such as photographic or video images in optical instrumentation, industrial controls, robotics, metrology, etc.

12 Claims, 17 Drawing Sheets

Related U.S. Application Data division of application No. 10/483,494, filed as application No. PCT/FR02/01911 on Jun. 5, 2002, now Pat. No. 7,792,378.

(51) Int. Cl.
*H04N 1/00* (2006.01)
*H04N 1/40* (2006.01)
*G06T 3/00* (2006.01)
*G06T 1/00* (2006.01)
*H04N 1/387* (2006.01)
*H04N 1/58* (2006.01)

(52) U.S. Cl.
CPC ............... *G06T 5/003* (2013.01); *G06T 5/006* (2013.01); *H04N 1/00007* (2013.01); *H04N 1/00045* (2013.01); *H04N 1/00071* (2013.01); *H04N 1/387* (2013.01); *H04N 1/40093* (2013.01); *H04N 1/58* (2013.01)

(58) Field of Classification Search
USPC ............... 382/100, 254, 255, 274, 275, 276, 283,382/293, 297; 358/2.1, 3.26, 3.27; 348/254; 702/85, 179–186; 396/311
See application file for complete search history.

(56) References Cited

U.S. PATENT DOCUMENTS

| | | | |
|---|---|---|---|
| 5,694,484 A | | 12/1997 | Cottrell et al. |
| 5,696,850 A | * | 12/1997 | Parulski et al. ............... 382/261 |
| 5,905,530 A | * | 5/1999 | Yokota ................... H04N 5/217 |
| | | | 348/240.99 |
| 5,963,271 A | * | 10/1999 | Ikeda ................... H04N 1/4092 |
| | | | 382/261 |
| 6,011,547 A | | 1/2000 | Shiota et al. |
| 6,061,152 A | | 5/2000 | Nihei et al. |
| 6,115,104 A | * | 9/2000 | Nakatsuka ....................... 355/40 |
| 6,273,535 B1 | * | 8/2001 | Inoue et al. .................. 382/261 |
| 6,366,360 B2 | | 4/2002 | Ejiri et al. |
| 6,381,375 B1 | | 4/2002 | Reyzin |
| 6,470,151 B1 | | 10/2002 | Ohsawa |
| 6,556,784 B2 | | 4/2003 | Onuki |
| 6,603,885 B1 | | 8/2003 | Enomoto |
| 6,795,572 B1 | * | 9/2004 | Matsuno ....................... 382/132 |
| 6,809,837 B1 | | 10/2004 | Mestha et al. |
| 6,865,287 B1 | | 3/2005 | Beneke |
| 6,937,370 B1 | | 8/2005 | Nitta et al. |
| 2001/0014180 A1 | | 8/2001 | Ejiri et al. |
| 2008/0320038 A1 | | 12/2008 | Liege |
| 2009/0037877 A1 | | 2/2009 | Liege |
| 2009/0228677 A1 | | 9/2009 | Liege |

FOREIGN PATENT DOCUMENTS

| | | |
|---|---|---|
| EP | 964 353 | 12/1999 |
| EP | 1 104 175 | 5/2001 |
| JP | 09-098299 | 4/1997 |
| JP | 09-139855 | 5/1997 |
| JP | 10-319929 | 12/1998 |
| JP | 2001-016449 | 1/2001 |
| JP | 2001-094848 | 4/2001 |
| WO | 99/27470 | 6/1999 |
| WO | 01/35052 | 5/2001 |

OTHER PUBLICATIONS

Clunie, D., "Medical Image Format FAQ—Part 3, Proprietary Formats", Jun. 3, 2001.
Chang et al., "Smart Image Design for Large Image Databases", Journal of Visual Languages and Computing, vol. 3, No. 4, pp. 323-342, Dec. 1, 1992.
www.imaging-resource.com/IRNEWS/archive/v02/20001020, "The Imaging Resource Digital Photography Newsletter", vol. 2, No. 21, Oct. 20, 2000.

* cited by examiner

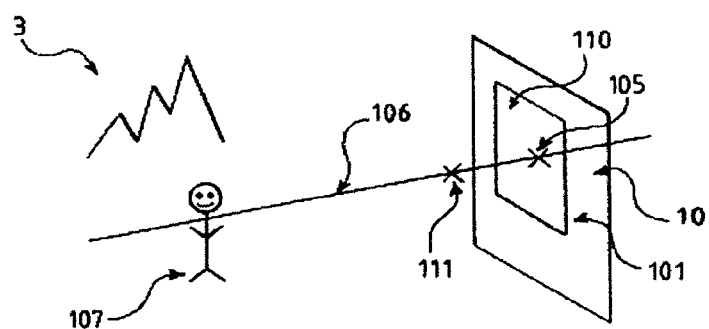
FIG_1
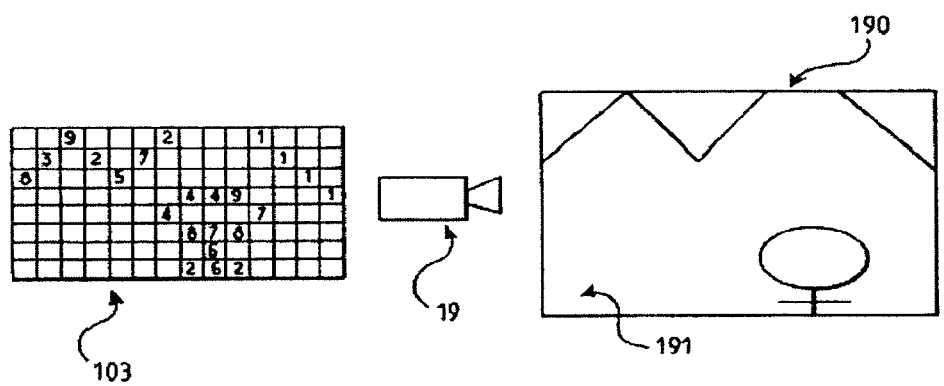
FIG_2

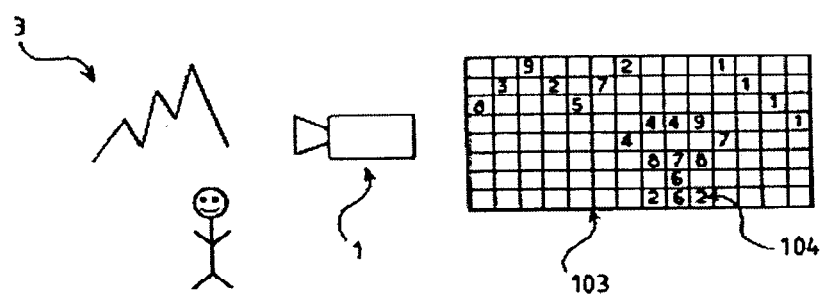
FIG_3
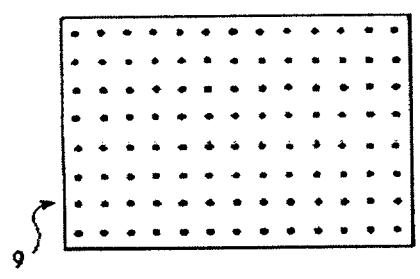
FIG_4a
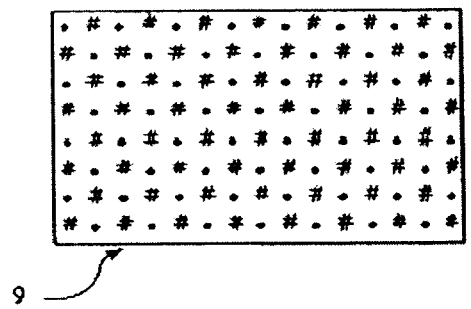
FIG_4b

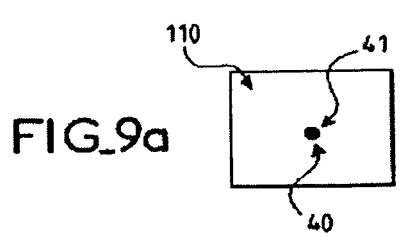
FIG_9a
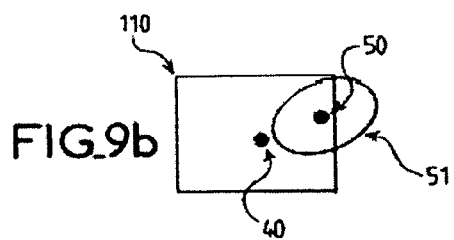
FIG_9b
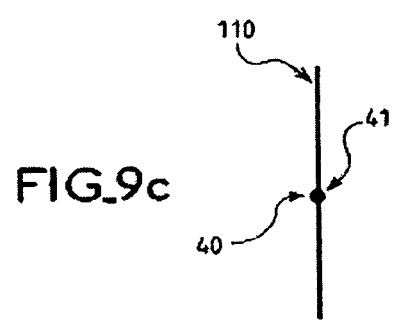
FIG_9c
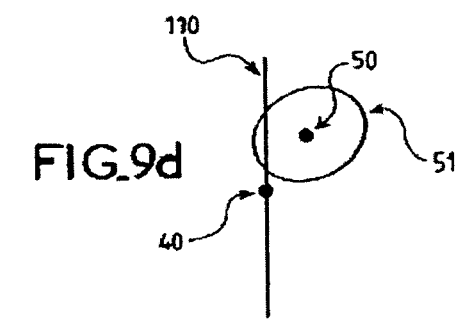
FIG_9d
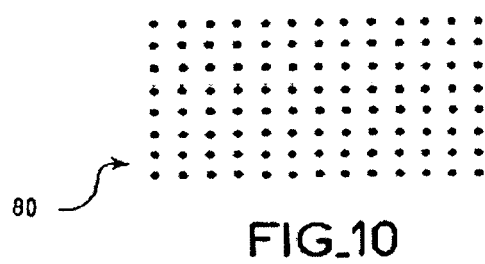
FIG_10

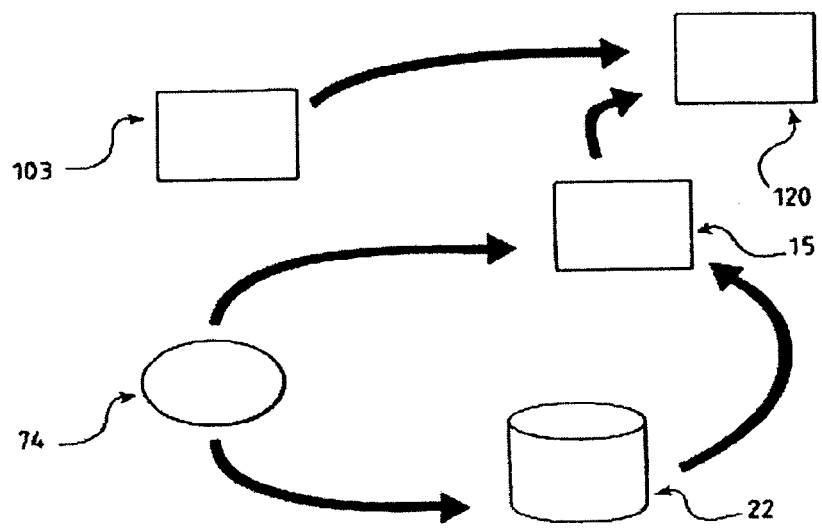
FIG_11
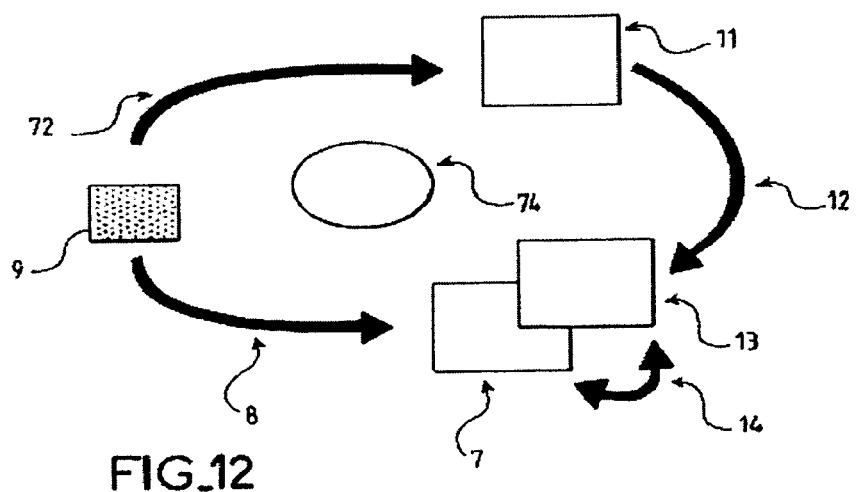
FIG_12

| OU1, 2 | = | [user's operator 1, 2] |
| BD | = | Database |
| UC | = | Central unit |

| | | |
|---|---|---|
| OU1, 2 | = | [user's operator 1, 2] |
| BD | = | Database |
| UC | = | Central unit |

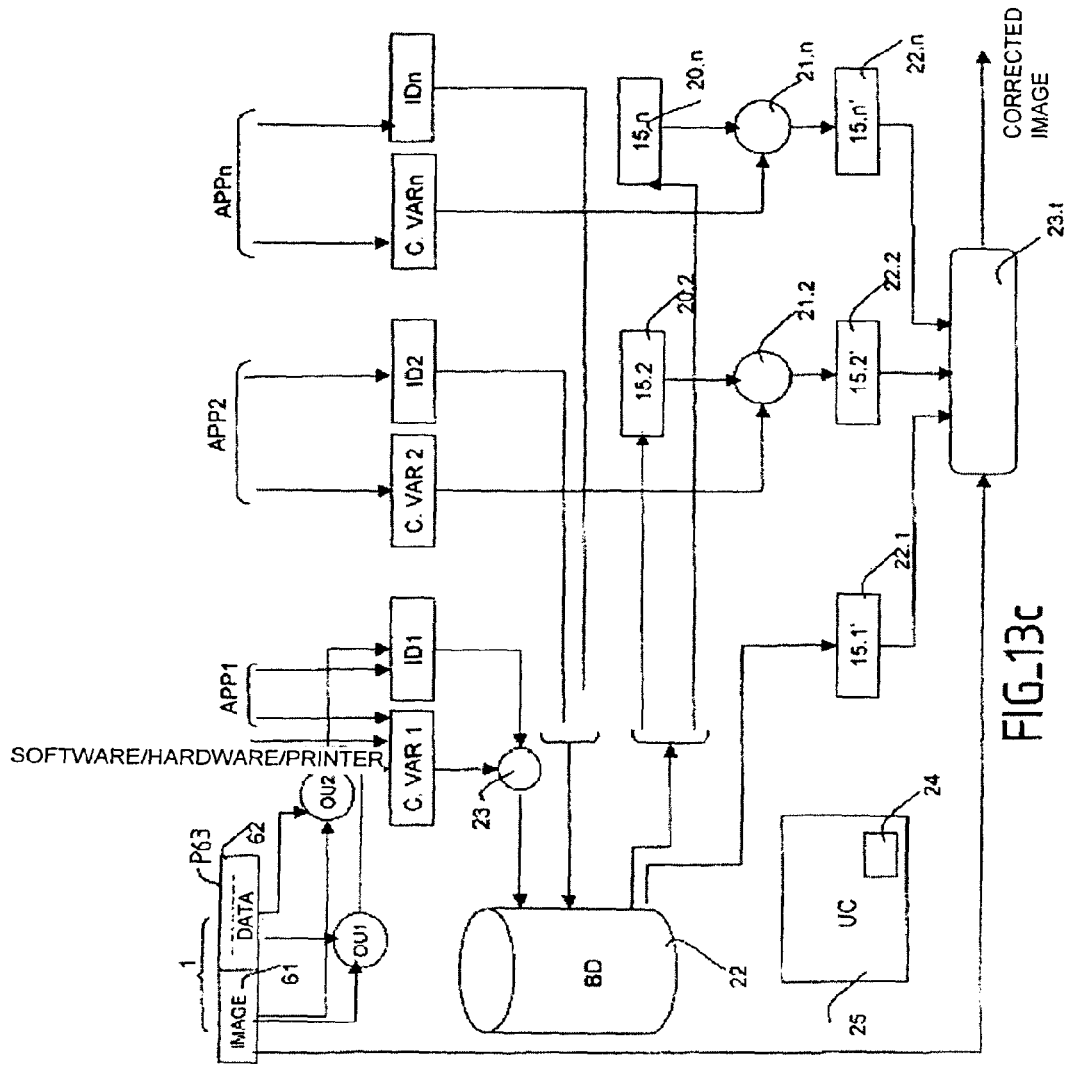
FIG_13c
| OU1, 2 | = | [user's operator 1, 2] |
| BD | = | Database |
| UC | = | Central unit |

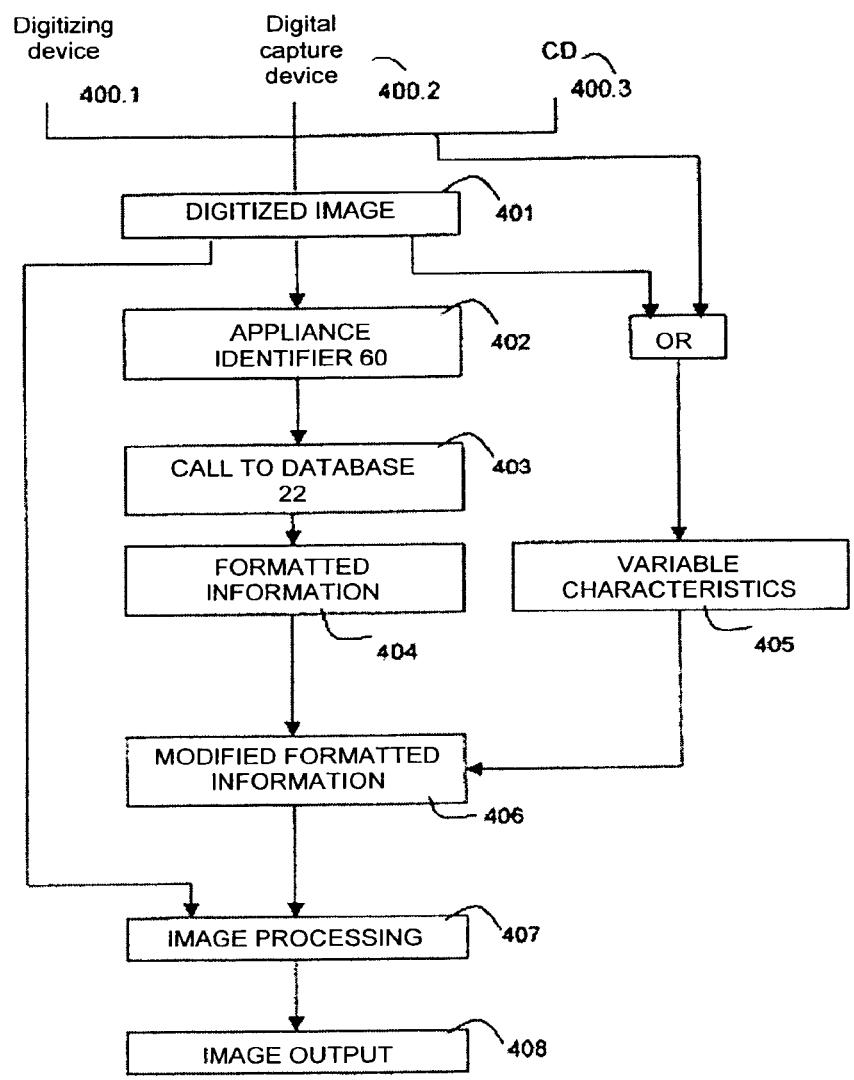
Fig_ 14a

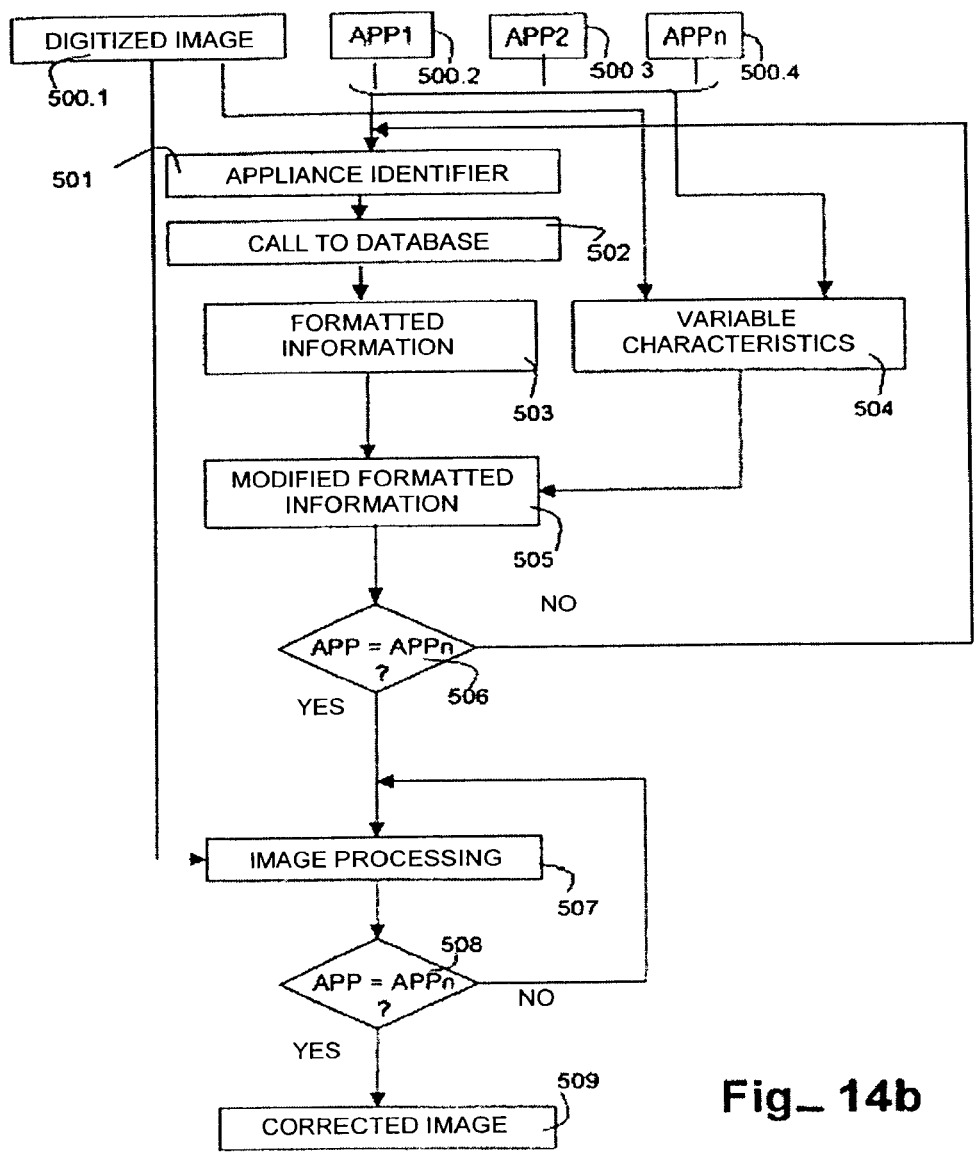
Fig_ 14b

Fig_15
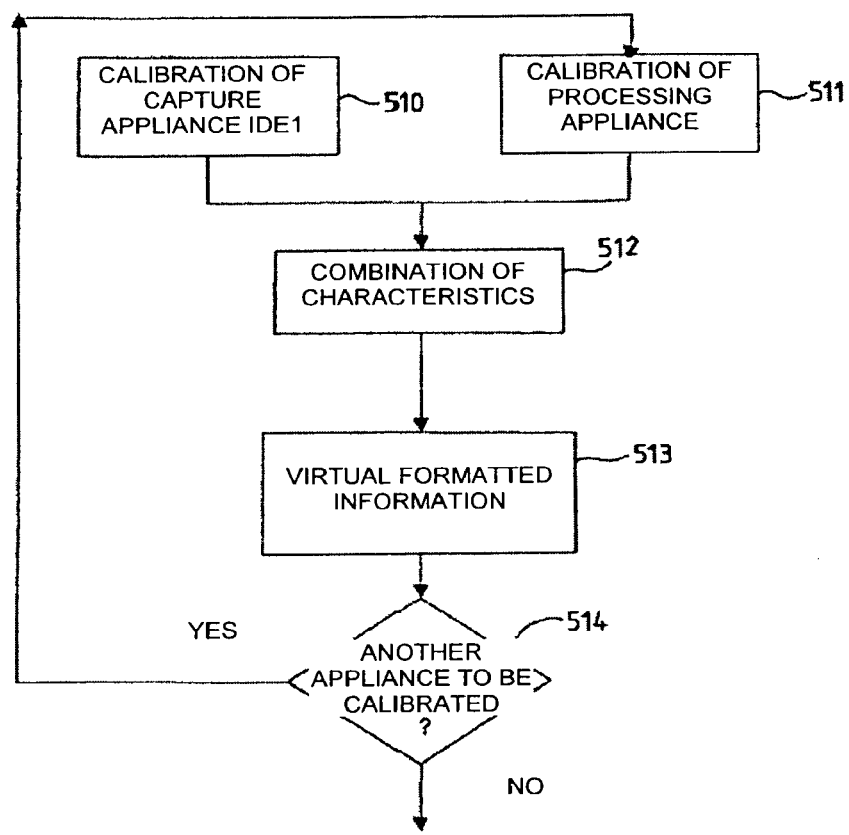

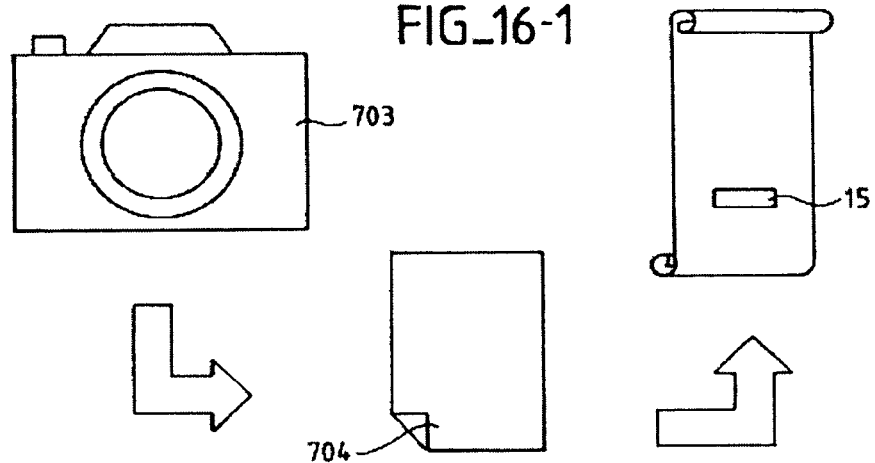
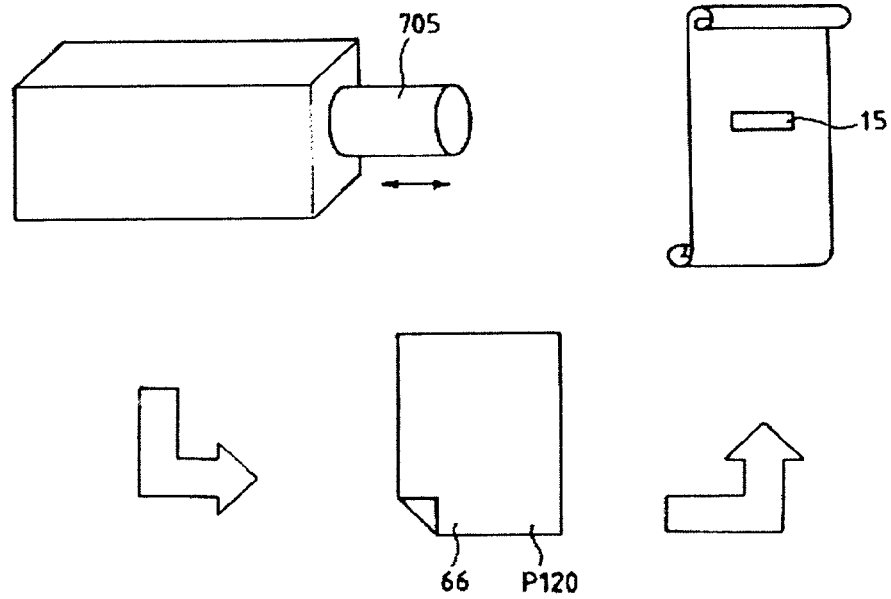

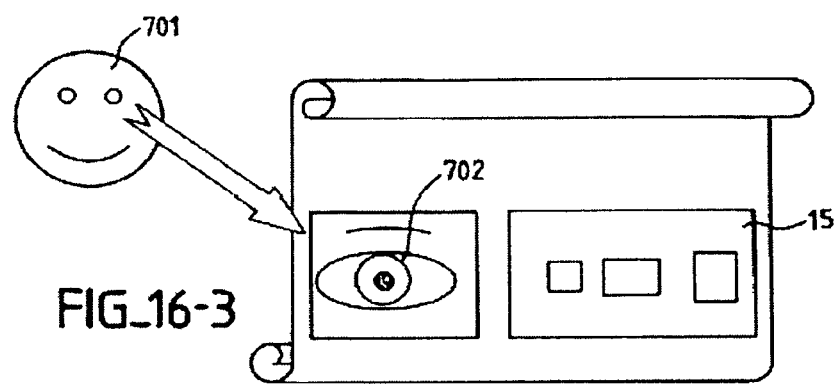
FIG_16-3
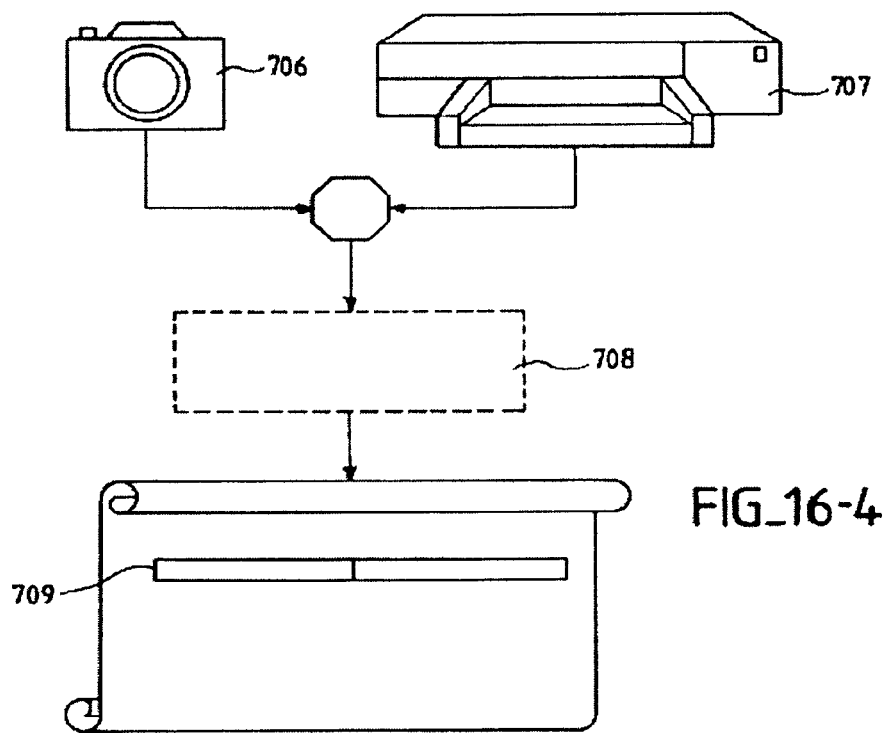
FIG_16-4

FIG_16-5
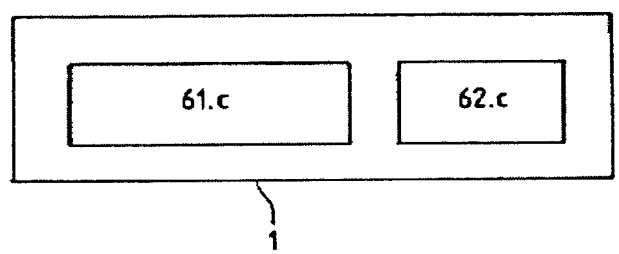
FIG_16-6
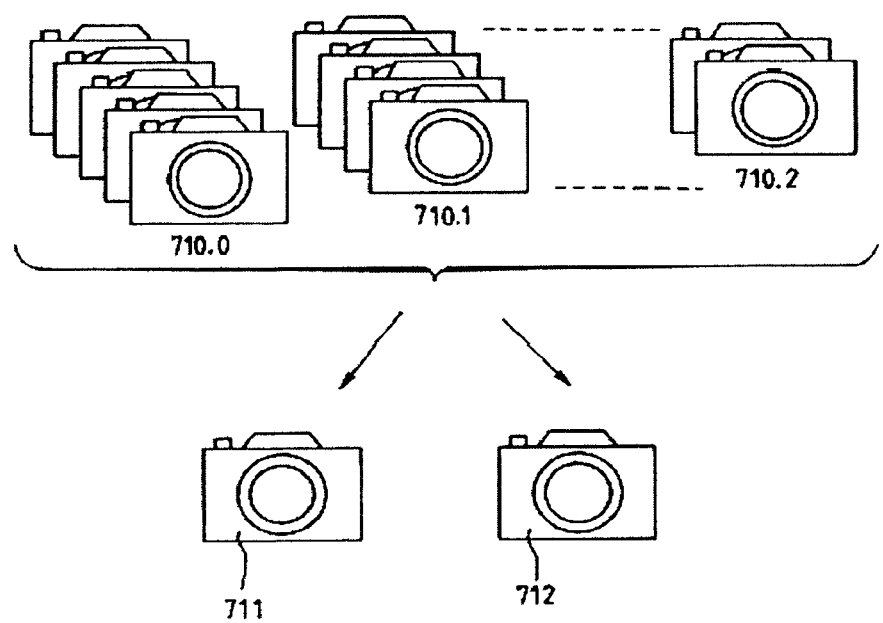

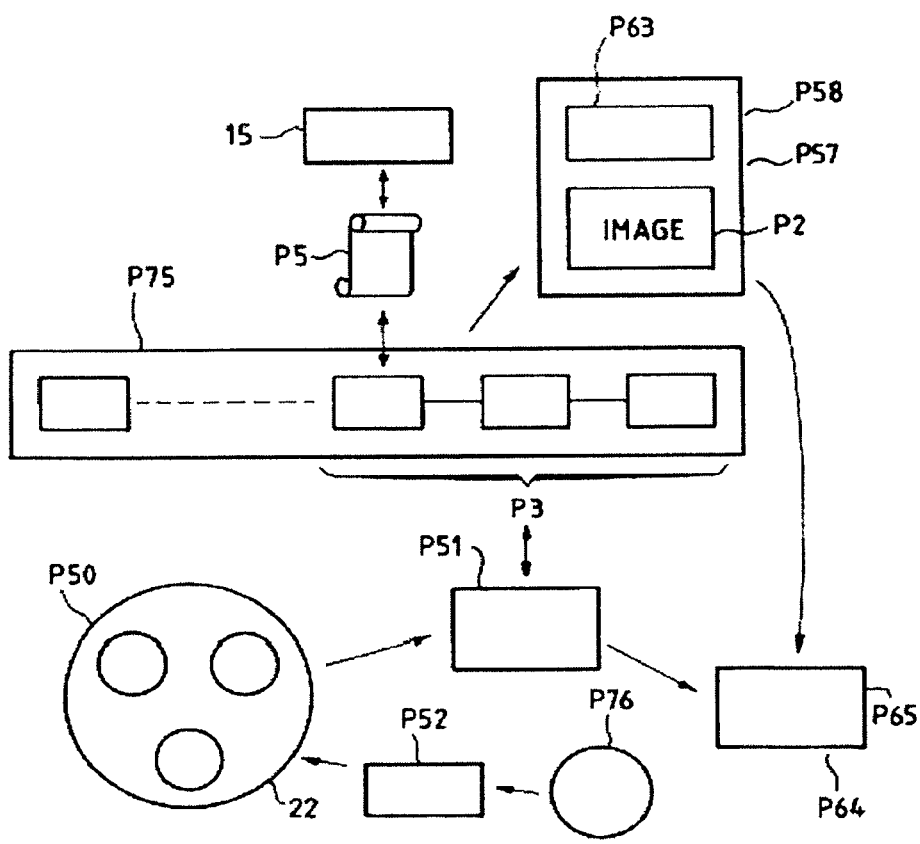
FIG_17
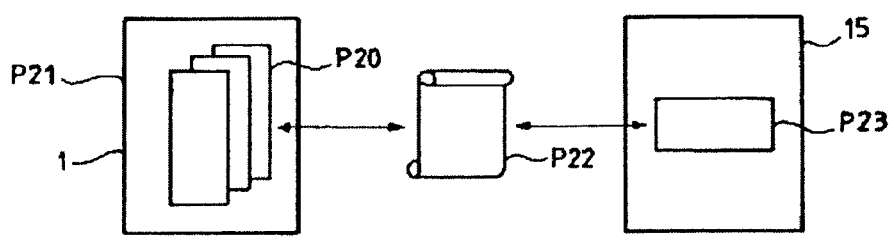
FIG_18

METHOD AND SYSTEM FOR MODIFYING IMAGE QUALITY OF AN IMAGE

CROSS-REFERENCE TO RELATED APPLICATIONS

This application is a continuation of U.S. Ser. No. 12/838,198, filed Jul. 16, 2010, which is a divisional of U.S. Ser. No. 10/483,494 filed Jun. 30, 2004, the entire contents of which is incorporated herein by reference, which is a National Stage of PCT/FR02/01911 filed Jun. 5, 2002, and claims priority under 35 U.S.C. 119 to France Application Nos. 01 09291 filed Jul. 12, 2001 and 01 09292 filed Jul. 12, 2001.

FIELD IN QUESTION, PROBLEM POSED

The present invention relates to a method and a system for modifying the quality of at least one image derived from or addressed to an appliance chain.

SOLUTION

Method

The invention relates to a method for modifying the quality of at least one image derived from or addressed to a specified appliance chain. The specified appliance chain includes at least one image-capture appliance and/or at least one image-restitution appliance. The image-capture appliances and/or the image-restitution appliances that have been commercialized gradually by distinct economic players belong to an indeterminate set of appliances. The appliances of the set of appliances exhibit defects that can be characterized by formatted information. For the image in question, the method includes the following stages:
 the stage of compiling directories of the sources of formatted information related to the appliances of the set of appliances,
 the stage of searching automatically, among the formatted information compiled in this way, for specific formatted information related to the specified appliance chain,
 the stage of modifying the image automatically by means of image-processing software and/or image-processing components, taking into account the specific formatted information obtained in this way.

Preferably, according to the invention, the method is such that the automatic search is performed by means of indices obtained directly or indirectly from an analysis of:
 the image, and/or
 the appliances of the appliance chain, and/or
 the means for loading the image into the image-processing software or components, and/or
 the means for loading the image modified by the image-processing software or components to the restitution means.

Preferably, according to the invention, the appliances of the appliance chain are identified by identifiers, especially a bar code. The analysis for the purpose of searching for the specific formatted information includes the stage of determining the identifiers.

Preferably, according to the invention, the method is such that the image, the index and/or the identifier are contained in the same file. It results from the combination of technical features that it is possible to employ the method according to the invention a posteriori in the case in which certain appliances of the chain were commercialized before the formatted information relating to them was established.

Preferably, according to the invention, the method is such that the image and at least one part of the specific formatted information are contained in the same image file. It results from the combination of technical features that it is possible to search automatically for the formatted information in the image file.

Preferably, according to the invention, the method additionally includes the stage of storing at least part of the formatted information in advance in a database. The method additionally includes the stage of updating the database.

Preferably, according to the invention, the method is such that one of the appliances of the appliance chain is provided with at least one variable characteristic depending on the image, especially the focal length. A fraction of the specific formatted information is related to the defects of the appliance provided with the variable characteristic. The method additionally includes the following stages:
 the stage of determining the value of the variable characteristics for the said image;
 the stage of determining the fraction of the said specific formatted information by taking into account the variable characteristic values obtained in this way.

Employment of the method for an appliance provided with a variable characteristic therefore amounts to employment of the method for an appliance that does not have any variable characteristic.

Preferably, according to the invention, the image is contained in a file. The method is such that, to determine the value of the variable characteristic, there are used data present in the file, especially data such as focal length, in a format such as the Exif standard. It results from the combination of technical features that it is possible to employ the method according to the invention a posteriori in the case in which the appliance provided with the variable characteristic was commercialized before the formatted information relating to it was established.

Preferably, according to the invention, the method is such that, to modify the quality of at least one image derived from or addressed to an appliance chain:
 there is determined a virtual appliance exhibiting defects equivalent to at least part of the defects, referred to hereinafter as original defects, of at least one appliance of the appliance chain,
 there is determined the virtual formatted information related to the defects of the virtual appliance,
 to determine the specific formatted information related to the set of appliances of the appliance chain, the virtual formatted information is substituted for the specific formatted information related to the original defects.

It results from the combination of technical features that, in this way, there is obtained formatted information which is simpler to employ and with which the modifications to be made to the image can be calculated more rapidly and/or by using less memory and/or with greater precision.

Preferably, according to the invention, the method is designed to modify the quality of at least one color plane of a color image. The color plane is characterized by a specified color. The specific formatted information additionally includes data related to the specified color. To modify the image, a color plane is calculated using the data related to the specified color and to the image.

Preferably, according to the invention, the method additionally includes, in the case in which the process of searching for specific formatted information is unsuccessful for one of the appliances of the appliance chain, the stage of calculating the unknown formatted information.

Preferably, according to the invention, the method additionally includes the stage of calculating the unknown formatted information related to an appliance of the appliance chain:
- by measuring the defects of the appliance, and/or
- by simulating the appliance.

Preferably, according to the invention, the method additionally includes, for an image-capture appliance of the appliance chain, the stage of calculating the unknown formatted information:
- by constructing a synthetic-image class by specified mathematical projections of at least one reference scene onto a surface,
- by capturing at least one reference image of each reference scene by means of the image-capture appliance,
- by choosing, within a set of parameterizable transformation models, that with which the reference image can be transformed to a transformed image close to the synthetic-image class of the reference scene.

The transformed image exhibits a deviation compared with the synthetic-image class. The unknown formatted information is composed at least partly of parameters of the chosen parameterizable transformation models.

Preferably, according to the invention, the method additionally includes:
- the stage of calculating the deviations between the transformed image and the synthetic-image class,
- the stage of associating the deviations with the said unknown formatted information.

It results from the combination of technical features that it is possible to deduce standardized information about the scenes in three dimensions. It results from the combination of technical features that it is possible to combine a plurality of images obtained from a plurality of image-capture appliances having undergone the same formatting process.

Preferably, according to the invention, the method is such that one of the appliances of the appliance chain is provided with at least one variable characteristic depending on the image, especially the focal length and/or the aperture. A fraction of the specific formatted information is related to the defects of the appliance provided with the variable characteristic or characteristics. Each variable characteristic is capable of being associated with a value to form a combination composed of the set of variable characteristics and values. The method additionally includes the stage of determining the fraction of unknown formatted information:
- by selecting predetermined combinations,
- by employing a process of iteration of the preceding stages of the method for each of the predetermined combinations,
- by employing a process of interpolation of the unknown formatted information related to an arbitrary combination, from the unknown formatted information obtained at the end of the iteration process.

Preferably, according to the invention, the method additionally includes, for an image-restitution means of the appliance chain, the stage of producing data characterizing the defects of the image-restitution means, especially the distortion characteristics. The unknown formatted information is composed at least partly of data characterizing the defects of the restitution means.

Preferably, according to the invention, the method is such that the specific formatted information related to one appliance or to a plurality of appliances of the appliance chain is determined in such a way that it can be applied to similar appliances. It results from the combination of technical features that only a limited quantity of formatted information is needed for the method to be employed.

Preferably, according to the invention, the method is such that the image includes associated information, especially a digital signal. The stages of the method are employed in such a way that they conserve or modify the associated information.

Preferably, according to the invention, the method additionally includes the stage of associating information with the modified image, especially information indicating that it has been modified.

Preferably, according to the invention, the method is more particularly designed to modify the visual quality of the image for an observer. The formatted information related to the defects of the appliances of the appliance chain additionally includes the formatted information related to the vision characteristics of the observer, especially functional anomalies of the eyes and/or of the brain of the observer.

Application

The invention also relates to an application of the method described hereinabove. The object of the application is to improve the quality of images processed by the image-processing software or the image-processing components, by correcting for the effects of at least one of the defects of the appliances of the appliance chain. It results from the combination of technical features that the quality of the processed images is improved if not perfect, without having to rely on expensive appliances.

Preferably, the object of the application is that the quality of images processed by the image-processing software or the image-processing components be comparable with that of images produced with a reference appliance chain.

Preferably, the application is such that, for the quality of the processed images to be comparable with that of images produced with a reference appliance chain, formatted information related to the appliance chain is produced by taking into account the defects of the reference appliance chain.

System

The invention relates to a system for modifying the quality of at least one image derived from or addressed to a specified appliance chain. The specified appliance chain includes at least one image-capture appliance and/or at least one image-restitution appliance. The image-capture appliances and/or the image-restitution appliances that have been commercialized gradually by distinct economic players belong to an indeterminate set of appliances. The appliances of the set of appliances exhibit defects that can be characterized by formatted information. For the image in question, the system includes data-processing means capable of:
- compiling directories of the sources of formatted information related to the appliances of the set of appliances,
- searching automatically, among the formatted information compiled in this way, for specific formatted information related to the specified appliance chain,
- modifying the image automatically by means of image-processing software and/or image-processing components, taking into account the specific formatted information obtained in this way.

Preferably, according to the invention, the system is such that the data-processing means perform the search automatically by means of an index. The index is obtained directly or indirectly by analysis means from an analysis of:
- the image, and/or
- the appliances of the appliance chain, and/or
- the means for loading the image into the image-processing software or components, and/or
- the means for loading the image modified by the image-processing software or components to the restitution means.

Preferably, according to the invention, the appliances of the appliance chain are identified by identifiers, especially a bar code. The analysis means include means for determining the identifiers.

Preferably, according to the invention, the system is such that the image, the index and/or the identifier are contained in the same file.

Preferably, according to the invention, the system is such that the image and at least one part of the specific formatted information are contained in the same image file.

Preferably, according to the invention, the system additionally includes storage means for storing at least part of the formatted information in advance in a database. The system additionally includes updating means for updating the database.

Preferably, according to the invention, the system is such that one of the appliances of the appliance chain is provided with at least one variable characteristic depending on the image, especially the focal length. A fraction of the specific formatted information is related to the defects of the appliance provided with the variable characteristic. The system additionally includes calculating means for determining:
- the value of the variable characteristics for the image in question;
- the fraction of the said specific formatted information by taking into account the variable values obtained in this way.

Preferably, according to the invention, the image is contained in a file. The system is such that, to determine the value of the variable characteristic, the system includes data-processing means for processing the data present in the file, especially data such as focal length, in a format such as the Exif standard.

Preferably, according to the invention, the system is such that, to modify the quality of at least one image derived from or addressed to an appliance chain, the system includes data-processing means for determining:
- a virtual appliance exhibiting defects equivalent to at least part of the defects, referred to hereinafter as original defects, of at least one appliance of the appliance chain,
- the virtual formatted information related to the defects of the virtual appliance.

The system is such that, to determine the specific formatted information related to the set of appliances of the appliance chain, the data-processing means include substitution means for substituting the virtual formatted information for the specific formatted information related to the original defects.

Preferably, according to the invention, the system is designed to modify the quality of at least one color plane of a color image. The color plane is characterized by a specific color. The specific formatted information additionally includes data related to the specified color. The system includes calculating means for calculating a color plane using the data related to the specified color and to the image.

Preferably, according to the invention, the system additionally includes, in the case in which the process of searching for specific formatted information is unsuccessful for one of the appliances of the appliance chain, calculating means for calculating the unknown formatted information.

Preferably, according to the invention, the system is such that the calculating means for calculating the unknown formatted information related to an appliance of the appliance chain include processing means for measuring the defects of the appliance and/or for simulating the appliance.

Preferably, according to the invention, the method additionally includes, for an image-capture appliance of the appliance chain, calculating means for calculating the unknown formatted information by constructing a synthetic-image class by specified mathematical projections of at least one reference scene onto a surface. The image-capture appliance captures at least one reference image of each reference scene. The calculating means calculate the unknown formatted information by choosing, within a set of parameterizable transformation models, that with which the reference image can be transformed to a transformed image close to the synthetic-image class of the reference scene. The transformed image exhibits a deviation compared with the synthetic-image class. The unknown formatted information is composed at least partly of parameters of the chosen parameterizable transformation models.

Preferably, according to the invention, the system additionally includes data-processing means for:
- calculating the deviations between the transformed image and the synthetic-image class,
- associating the deviations with the unknown formatted information.

Preferably, according to the invention, the system is such that one of the appliances of the appliance chain is provided with at least one variable characteristic depending on the image, especially the focal length and/or the aperture. A fraction of the specific formatted information is related to the defects of the appliance provided with the variable characteristic or characteristics. Each variable characteristic is capable of being associated with a value to form a combination composed of the set of variable characteristics and values. The system additionally includes data-processing means for determining the fraction of unknown formatted information:
- by selecting predetermined combinations,
- by employing, for each of the predetermined combinations, a process of iteration of the calculating means and of the data-processing means described hereinabove,
- by employing a process of interpolation of the unknown formatted information related to an arbitrary combination, from the unknown formatted information obtained at the end of the iteration process.

Preferably, according to the invention, the system additionally includes, for an image-restitution means of the appliance chain, data-processing means for producing data characterizing the defects of the image-restitution means, especially the distortion characteristics. The unknown formatted information is composed at least partly of data characterizing the defects of the restitution means.

Preferably, according to the invention, the system is such that the specific formatted information related to one appliance or to a plurality of appliances of the appliance chain is determined in such a way that it can be applied to similar appliances.

Preferably, according to the invention, the system is such that the image includes associated information, especially a digital signal. The system is employed in such a way that it conserves or modifies the associated information.

Preferably, according to the invention, the system additionally includes data-processing means for associating information with the modified image, especially information indicating that it has been modified.

Preferably, according to an alternative embodiment of the invention, the system is more particularly designed to modify the visual quality of the image for an observer. The formatted information related to the defects of the appliances of the said appliance chain additionally includes the formatted information related to the vision characteristics of the said observer, especially functional anomalies of the eyes and/or of the brain of the said observer.

DETAILED DESCRIPTION

Other characteristics and advantages of the invention will become apparent upon reading of the description of practical examples of the invention, provided on a non-limitative basis, and of the figures, wherein:

FIG. 1 illustrates a schematic view of image capture,

FIG. 2 illustrates a schematic view of image restitution,

FIG. 3 illustrates a schematic view of the pixels of an image,

FIGS. 4a and 4b illustrate two schematic views of a reference scene,

Figure 5:
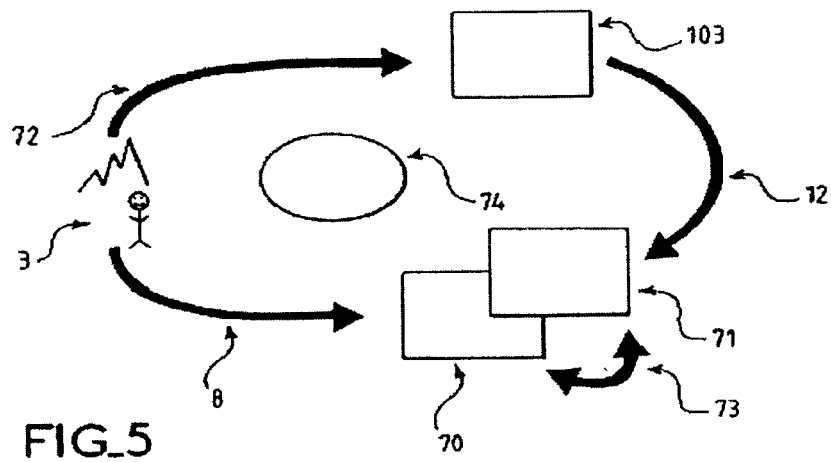
Figure 6:
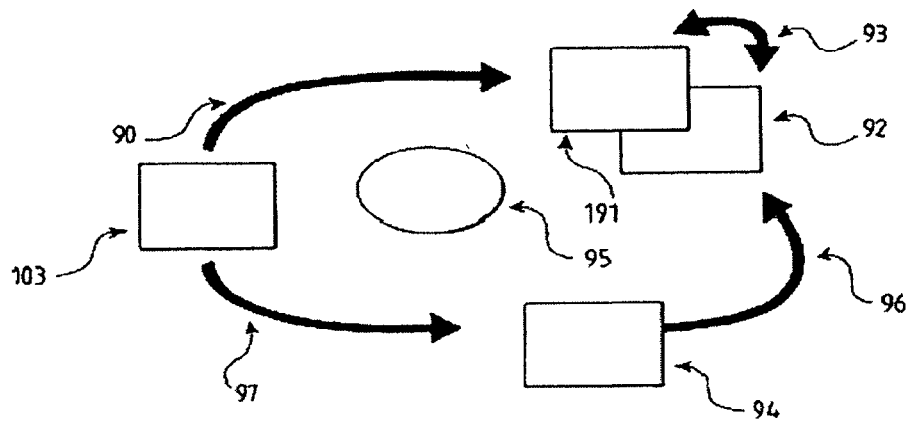
Figure 7:
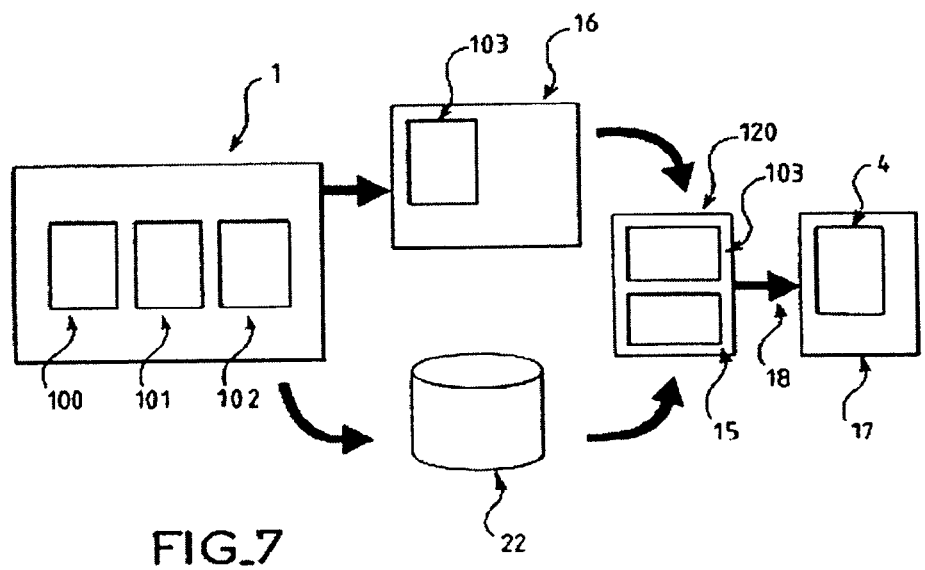
Figure 8:
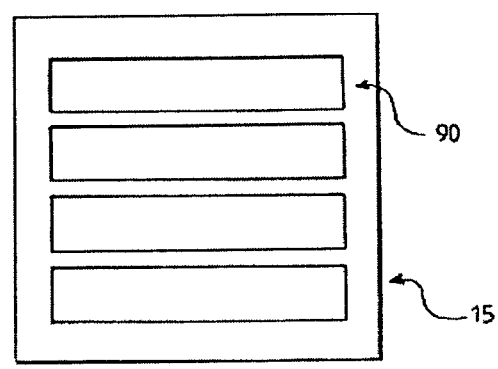
Figure 13A:
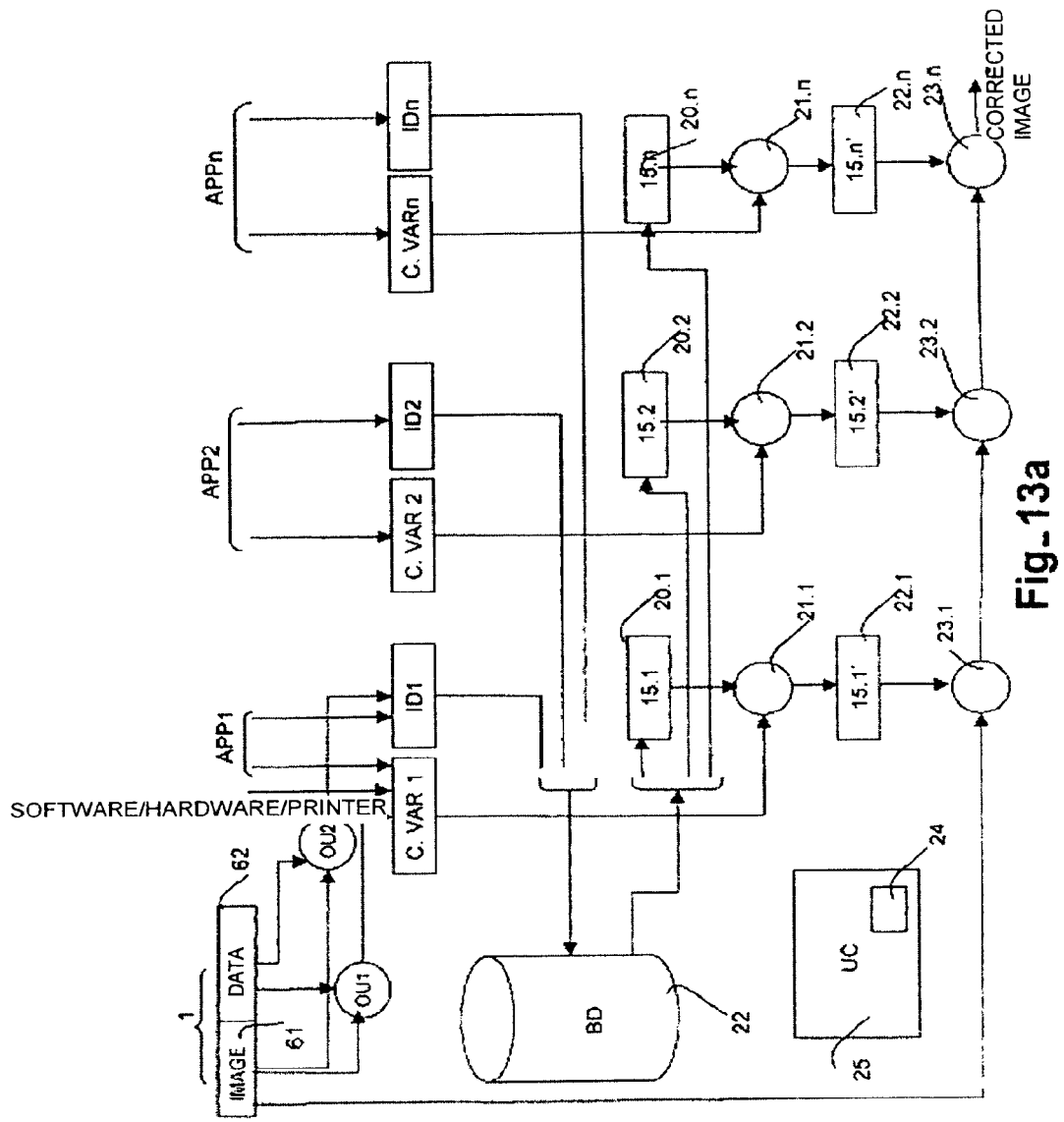
Figure 13B:
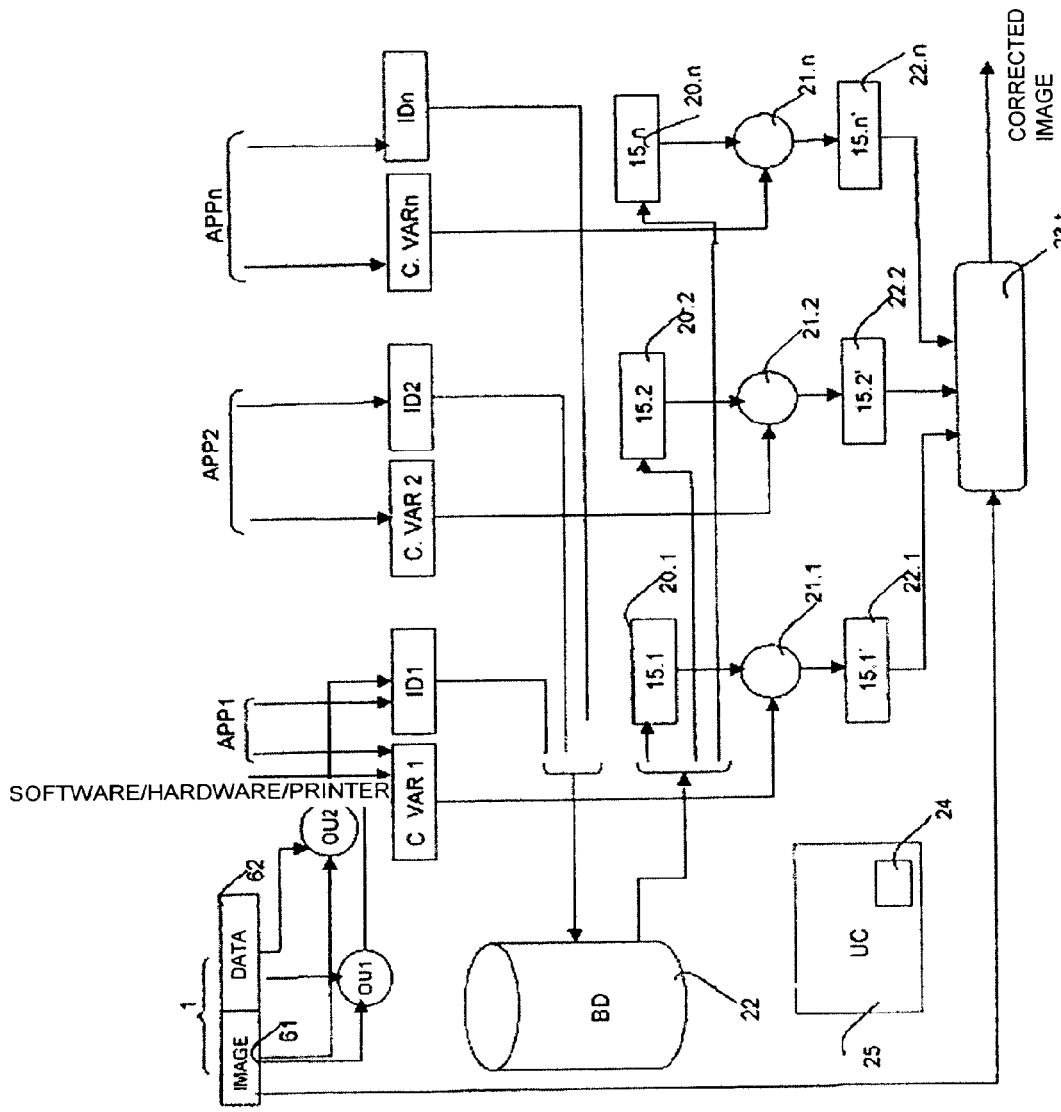
Figure 14C:
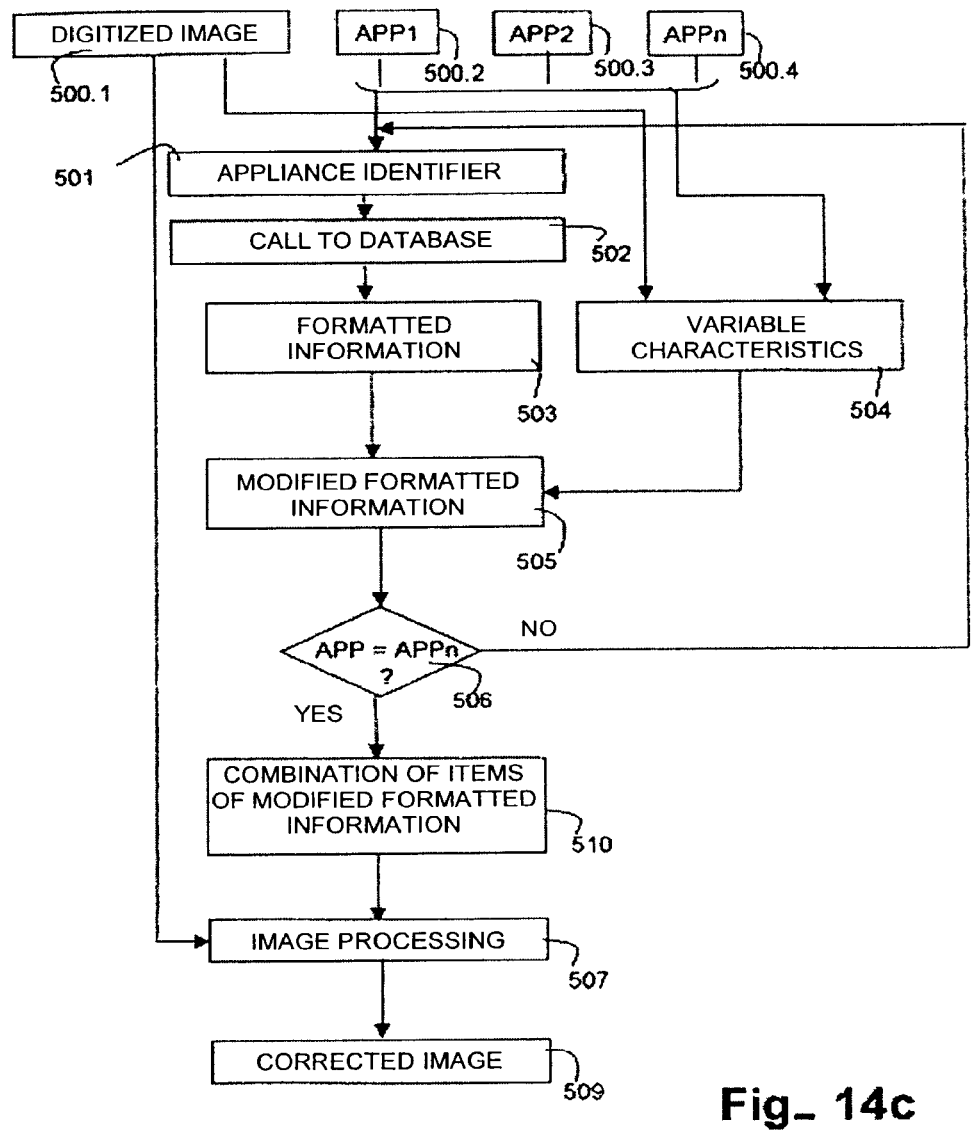

FIG. 5 illustrates the organizational diagram of the method with which the difference between the mathematical image and the corrected image can be calculated, FIG. 6 illustrates the organizational diagram of the method with which the best restitution transformation for an image-restitution means can be obtained, FIG. 7 illustrates a schematic view of the elements composing the system to which the invention is applied, FIG. 8 illustrates a schematic view of fields of formatted information, FIG. 9a illustrates a schematic front view of a mathematical point, FIG. 9b illustrates a schematic front view of a real point of an image, FIG. 9c illustrates a schematic side view of a mathematical point, FIG. 9d illustrates a schematic profile view of a real point of an image, FIG. 10 illustrates a schematic view of an array of characteristic points, FIG. 11 illustrates the organizational diagram of the method with which the formatted information can be obtained, FIG. 12 illustrates the organizational diagram of the method with which the best transformation for an image-capture appliance can be obtained, FIGS. 13a to 13c illustrate connection diagrams of practical examples of systems with which an image can be corrected, FIGS. 14a to 14c illustrate organizational diagrams of practical examples of methods with which automatic image correction can be employed, FIG. 15 illustrates an organizational diagram of a method with which a virtual appliance can be substituted for an appliance chain, FIG. 16.1 illustrates a diagram of an appliance possessing defects, FIG. 16.2 illustrates a diagram of an appliance possessing variable characteristics, FIG. 16.3 illustrates a diagram that includes a vision defect or defects of an observer, FIG. 16.4 illustrates a diagram of processing of the characteristics of a virtual appliance, FIG. 16.5 illustrates a diagram of the addition of information associated with a corrected image, FIG. 16.6 illustrates a diagram indicating how the formatted information may relate to one or more lots of appliances, FIG. 17 illustrates a description of an example of employment of the method and system according to the invention, FIG. 18 illustrates a description of an example of employment of the method and system according to the invention in the case of a color image.

APPLIANCE CHAIN

Referring in particular to FIG. 17, a description will be given of the concept of appliance chain P3. The appliances of appliance chain P3, especially image-capture appliances and/or image-restitution appliances, are being progressively commercialized by distinct economic players, and they belong to an indeterminate set of appliances also defined as set P75 of appliances.

Within the meaning of the invention, an appliance can be in particular:

an image-capture appliance, such as a disposable photo appliance, a digital photo appliance, a reflex appliance, a scanner, a fax machine, an endoscope, a camcorder, a surveillance camera, a game, a camera integrated into or connected to a telephone, to a personal digital assistant or to a computer, a thermal camera or an echographic appliance, an image-restitution appliance or image-restitution means 19, such as a screen, a projector, a television set, virtual-reality goggles or a printer, an appliance, including its installation, such as a projector, a screen and the manner in which they are positioned, the positioning of an observer relative to an image-restitution appliance, which introduces parallax errors in particular, a human being having vision defects, such as astigmatism, an appliance which it is hoped can be emulated, to produce images having, for example, an appearance similar to those produced by an appliance of the Leica brand, an image-processing device, such as zoom software, which has the edge effect of adding blurring, a virtual appliance equivalent to a plurality of appliances, A more complex appliance, such as a scanner/fax/printer, a photo-printing Minilab, or a videoconferencing appliance can be regarded as an appliance or as a plurality of appliances.

An appliance chain P3 is defined as a set of appliances. The concept of appliance chain P3 may also include a concept of order.

The following examples constitute appliance chains P3:

a single appliance, an image-capture appliance and an image-restitution appliance, a photo appliance, a scanner or a printer, for example in a photo-printing Minilab, a digital photo appliance or a printer, for example in a photo-printing Minilab, a scanner, a screen or a printer, for example in a computer, a screen or projector, and the eye of a human being, one appliance and another appliance which it is hoped can be emulated, a photo appliance and a scanner, an image-capture appliance and image-processing software, image-processing software and an image-restitution appliance, a combination of the preceding examples, another set of appliances.

Defect

Referring in particular to FIG. 17, a description will now be given of the concept of defect P5. A defect P5 of an appliance of the appliance set P75 is defined as a defect related to the characteristics of the optical system and/or of the sensor and/or of the electronic unit and/or of the software integrated in an appliance; examples of defects P5 include distortion, blurring, vignetting, chromatic aberrations, rendering of colors, flash uniformity, sensor noise, grain, astigmatism, spherical aberration.

Image

Referring in particular to FIG. 17, a description will now be given of the concept of image P2. Image P2 is defined as a digital image captured or modified or restituted by an appliance. Image P2 may originate from an appliance of appliance chain P3. Image P2 may be addressed to an appliance of appliance chain P3. More generally, image P2 may be derived from and/or addressed to appliance chain P3. In the case of animated images, such as video images, composed of a time sequence of fixed images, image P2 is defined as one fixed image of the sequence of images.

Formatted Information

Referring in particular to FIG. 17, a description will now be given of the concept of formatted information 15. Formatted information 15 is defined as data related to the defects P5 of one or more appliances of appliance chain P3 and enabling image-processing means to modify the quality of images P2 by making allowance for the defects P5 of appliance. To produce the formatted information 15, there can be used various methods and systems based on measurements and/or captures or restitution of references, and/or simulations.

To produce the formatted information 15, it is possible, for example, to use the method and the system described in the International Patent Application filed on the same day as the present application in the name of Vision IQ and entitled "Method and system for producing formatted information related to the defects of appliances of an appliance chain and formatted information addressed to image-processing means." That application describes a method for producing formatted information 15 related to the defects P5 of appliances of an appliance chain P3. The formatted information 15 is addressed to image-processing means, in particular software, with a view to modifying the quality of the images processed by the image-processing means. Appliance chain P3 is composed in particular of at least one image-capture appliance and/or at least one restitution means and/or at least one observer. The method comprises the stage of producing data characterizing the defects P5 of the appliances of appliance chain P3. The data are the formatted information 15.

To produce the formatted information 15, it is possible, for example, to use the method and the system described in the International Patent Application filed on the same day as the present application in the name of Vision IQ and entitled "Method and system for producing formatted information related to geometric distortions". That application describes a method for producing formatted information 15 related to the appliances of an appliance chain P3. Appliance chain P3 is composed in particular of at least one image-capture appliance and/or at least one image-restitution appliance. The method includes the stage of producing formatted information 15 related to the geometric distortions of at least one appliance of the chain.

Appliance preferably makes it possible to capture or restitute an image on a medium. Appliance contains at least one fixed characteristic and/or one variable characteristic depending on the image. The fixed characteristic and/or variable characteristic can be associated with one or more values of characteristics, especially the focal length and/or the focusing and their values of associated characteristics. The method includes the stage of producing, from a measured field, measured formatted information related to the geometric distortions of the appliance. The formatted information 15 may include the measured formatted information.

To produce the formatted information 15, it is possible, for example, to use the method and the system described in the International Patent Application filed on the same day as the present application in the name of Vision IQ and entitled "Method and system for producing formatted information related to the defects of at least one appliance of a chain, especially to blurring". That application describes a method for producing formatted information 15 related to the appliances of an appliance chain P3. Appliance chain P3 is composed in particular of at least one image-capture appliance and/or at least one image-restitution appliance. The method includes the stage of producing formatted information 15 related to the defects P5 of at least one appliance of the chain. Preferably, appliance with which an image can be captured or restituted contains at least one fixed characteristic and/or one variable characteristic depending on the image (I). The fixed and/or variable characteristics can be associated with one or more values of characteristics, especially the focal length and/or the focusing and their values of associated characteristics. The method includes the stage of producing measured formatted information related to the defects P5 of appliance from a measured field. The formatted information 15 may include the measured formatted information.

To provide the formatted information 15, it is possible, for example, to use the method and the system described in the International Patent Application filed on the same day as the present application in the name of Vision IQ and entitled "Method and system for providing formatted information in a standard format to image-processing means." That application describes a method for providing formatted information 15 in a standard format to image-processing means, in particular software and/or components. The formatted information 15 is related to the defects P5 of an appliance chain P3. The appliance chain P3 is composed in particular of at least one image-capture appliance and/or one image-restitution appliance. The image-processing means use the formatted information 15 to modify the quality of at least one image P2 derived from or addressed to the appliance chain P3. The formatted information 15 comprises data characterizing the defects P5 of the image-capture appliance, in particular the distortion characteristics, and/or data characterizing the defects of the image-restitution appliance, in particular the distortion characteristics.

The method includes the stage of filling in at least one field of the standard format with the formatted information 15. The field is designated by its field name, the field containing at least one field value.

To produce the formatted information 15, it is possible, for example, to use the method and the system described in the International Patent Application filed on the same day as the present application in the name of Vision IQ and entitled "Method and system for reducing update frequency of image processing means". That application describes a method for reducing the update frequency of image-processing means, in particular software and/or a component. The image-processing means make it possible to modify the quality of the digital images derived from or addressed to an appliance chain P3. Appliance chain P3 is composed in particular of at least one image-capture appliance and/or at least one image-restitution appliance. Image-processing means employ formatted information 15 related to the defects P5 of at least one appliance of appliance chain P3. The formatted information P3 depends on at least one variable. The formatted information makes it possible to establish a correspondence between one part of the variables and of the identifiers. By means of the identifiers it is possible to determine the value of the variable corresponding to the identifier by taking the identifier and the image into account. It results from the combination of technical features that it is possible to determine the value of a variable, especially in the case in which the physical significance and/or the content of the variable are known only after distribution of image-processing means. It also results from the combination of technical features that the time between two updates of the correction software can be spaced apart. It also results from the combination of technical features that the various economic players that produce appliances and/or image-processing means can update their products independently of other economic players, even if the latter radically change the characteristics of their product or are unable to force their client to update their products. It also results from the combination of technical features that a new functionality can be deployed progressively by starting with a limited number of economic players and pioneer users.

To exploit the formatted information 15, it is possible, for example, to use the method and the system described in the International Patent Application filed on the same day as the present application in the name of Vision IQ and entitled "Method and system for calculating a transformed image from a digital image and formatted information related to a geometric transformation". That application describes a method for calculating a transformed image from a digital image and formatted information 15 related to a geometric transformation, especially formatted information 15 related to the distortions and/or chromatic aberrations of an appliance chain P3. The method includes the stage of calculating the transformed image from an approximation of the geometric transformation. It results therefrom that the calculation is economical in terms of memory resources, in memory bandpass, in calculating power and therefore in electricity consumption. It also results therefrom that the transformed image does not exhibit any visible or annoying defect as regards its subsequent use.

To exploit the formatted information 15, it is possible, for example, to use the method and the system described in the International Patent Application filed on the same day as the present application in the name of Vision IQ and entitled "Method and system for modifying a digital image, taking into account its noise". That application describes a method for calculating a transformed image from a digital image and formatted information 15 related to the defects P5 of an appliance chain P3. Appliance chain P3 includes image-capture appliances and/or image-restitution appliances. Appliance chain P3 contains at least one appliance. The method includes the stage of automatically determining the characteristic data from the formatted information 15 and/or the digital image. It results from the combination of technical features that the transformed image does not exhibit any visible or annoying defect, especially defects related to noise, as regards its subsequent use.

Image-Processing Means

The following example illustrates one manner of producing the formatted information.

FIG. 1 illustrates a scene 3 containing an object 107, a sensor 101 and sensor surface 110, an optical center 111, an observation point 105 on a sensor surface 110, an observation direction 106 passing through observation point 105, optical center 111, scene 3, and a surface 10 geometrically associated with sensor surface 110.

FIG. 2 illustrates an image 103, an image-restitution means 19 and a restituted image 191 obtained on the restitution medium 190.

FIG. 3 illustrates a scene 3, an image-capture appliance 1 and an image 103 composed of pixels 104.

FIGS. 4a and 4b illustrate two alternative versions of a reference scene 9.

FIG. 5 illustrates an organizational diagram employing a scene 3, a mathematical projection 8 giving a mathematical image 70 of scene 3, a real projection 72 giving an image 103 of scene for the characteristics 74 used, a parameterizable transformation model 12 giving a corrected image 71 of image 103, the corrected image 71 exhibiting a difference 73 compared with mathematical image 70.

FIG. 6 illustrates an organizational diagram employing an image 103, a real restitution projection 90 giving a restituted image 191 of image 103 for the restitution characteristics 95 used, a parameterizable restitution transformation model 97 giving a corrected restitution image 94 of image 103, a mathematical restitution projection 96 giving a mathematical restitution image 92 of corrected restitution image 94 and exhibiting a restitution difference 93 compared with restituted image 191.

FIG. 7 illustrates a system comprising an image-capture appliance 1 composed of an optical system 100, of a sensor 101 and of an electronic unit 102. FIG. 7 also illustrates a memory zone 16 containing an image 103, a database 22 containing formatted information 15, and means 18 for transmission of completed image 120 composed of image 103 and formatted information 15 to calculating means 17 containing image-processing software 4.

FIG. 8 illustrates formatted information 15 composed of fields 90.

FIGS. 9a to 9d illustrate a mathematical image 70, an image 103, the mathematical position 40 of a point, and the mathematical shape 41 of a point, compared with the real position 50 and the real shape 51 of the corresponding point of the image.

FIG. 10 illustrates an array 80 of characteristic points.

FIG. 11 illustrates an organizational diagram employing an image 103, the characteristics 74 used, and a database 22 of characteristics. The formatted information 15 is obtained from the characteristics 74 used and stored in database 22. The completed image 120 is obtained from image 103 and formatted information 15.

FIG. 12 illustrates an organizational diagram employing a reference scene 9, a mathematical projection 8 giving a synthetic image class 7 of reference scene 9, and a real projection 72 giving a reference image 11 of reference scene 9 for the characteristics 74 used. This organizational diagram also employs a parameterizable transformation model 12 giving a transformed image 13 of reference image 11. Transformed image 13 exhibits a deviation 14 compared with synthetic image class 7.

DEFINITIONS AND DETAILED DESCRIPTION

Other characteristics and advantages of the invention will become apparent on reading:
  of the definitions explained hereinafter of the employed technical terms, referring to the indicative and non-limitative examples of FIGS. 1 to 12,
  of the description of FIGS. 1 to 12.

Scene

Scene 3 is defined as a place in three-dimensional space, containing objects 107 illuminated by light sources.

Image-Capture Appliance, Image, Image Capture

Referring to FIGS. 3 and 7, a description will now be given of what is understood by image-capture appliance 1 and image 103. Image-capture appliance 1 is defined as an appliance composed of an optical system 100, of one or more sensors 101, of an electronic unit 102 and of a memory zone 16. By means of the said image-capture appliance 1, it is possible to obtain, from a scene 3, fixed or animated digital images 103 recorded in memory zone or transmitted to an external device. Animated images are composed of a succession of fixed images 103 in time. The said image-capture appliance 1 can have the form in particular of a photographic appliance, of a video camera, of a camera connected to or integrated in a PC, of a camera connected to or integrated in a personal digital assistant, of a camera connected to or integrated in a telephone, of a videoconferencing appliance or of a measuring camera or appliance sensitive to wavelengths other than those of visible light, such as a thermal camera.

Image capture is defined as the method by which image 103 is calculated by image-capture appliance 1.

In the case in which an appliance is equipped with a plurality of interchangeable subassemblies, especially an optical system 100, image-capture appliance 1 is defined as a special configuration of the appliance.

Image-Restitution Means, Restituted Image, Image Restitution

Referring to FIG. 2, a description will now be given of what is understood by image-restitution means 19. Such an image-restitution means 19 can have the form in particular of a visual display screen, of a television screen, of a flat screen, of a projector, of virtual reality goggles, of a printer.

Such an image-restitution means 19 is composed of:
  an electronic unit,
  one or more sources of light, of electrons or of ink,
  one or more modulators: devices for modulation of light, of electrons or of ink,
  a focusing device, having in particular the form of an optical system in the case of a light projector or the form of electron-beam focusing coils in the case of a CRT screen, or the form of filters in the case of a flat screen,
  a restitution medium 190 having in particular the form of a screen in the case of a CRT screen, of a flat screen or of a projector, the form of a print medium on which printing is performed in the case of a printer, or the form of a virtual surface in space in the case of a virtual-image projector.

By means of the said image-restitution means 19, it is possible to obtain, from an image 103, a restituted image 191 on restitution medium 190.

Animated images are composed of a succession of fixed images in time.

Image restitution is defined as the method by which the image is displayed or printed by means of image restitution means 19.

In the case in which a restitution means 19 is equipped with a plurality of interchangeable subassemblies or of subassemblies that can be shifted relative to one another, especially restitution medium 190, image-restitution means 19 is defined as a special configuration.

Sensor Surface, Optical Center, Focal Distance

Referring to FIG. 1, a description will now be given of what is defined as sensor surface 110.

Sensor surface 110 is defined as the shape in space drawn by the sensitive surface of sensor 101 of image-capture appliance at the moment of image capture. This surface is generally plane.

An optical center 111 is defined as a point in space associated with image 103 at the moment of image capture. A focal distance is defined as the distance between this point 111 and plane 110, in the case in which sensor surface 110 is plane.

Pixel, Pixel Value, Exposure Time

Referring to FIG. 3, a description will now be given of what is understood by pixel 104 and pixel value.

A pixel 104 is defined as an elemental zone of sensor surface 110 obtained by creating a grid, generally regular, of the said sensor surface 110. Pixel value is defined as a number associated with this pixel 104.

Image capture is defined as determining the value of each pixel 104. The set of these values constitutes image 103.

During image capture, the pixel value is obtained by integration, over the surface of pixel 104, during a time period defined as exposure time, of part of the light flux derived from scene 3 via optical system 100, and by converting the result of this integration to a digital value. The integration of the light flux and/or the conversion of the result of this integration to a digital value are performed by means of electronic unit 102.

This definition of the concept of pixel value is applicable to the case of black-and-white or color images 103, whether they be fixed or animated.

Depending on the cases, however, the part in question of the light flux is obtained in various ways:
  a) In the case of a color image 103, sensor surface 110 is generally composed of a plurality of types of pixels 104, associated respectively with light fluxes of different wavelengths, examples being red, green and blue pixels.

b) In the case of a color image 103, there may also be a plurality of sensors 101 disposed side-by-side, each receiving part of the light flux.

c) In the case of a color image 103, the colors used may be different from red, green and blue, such as for North American NTSC television, and they may exceed three in number.

d) Finally, in the case of an interlaced television scanning camera, the animated images produced are composed of an alternation of images 103 containing even-numbered lines and of images 103 containing odd-numbered lines.

Configuration Used, Adjustments Used, Characteristics Used

The configuration used is defined as the list of removable subassemblies of image-capture appliance 1, such as optical system 100 which, if it is interchangeable, is mounted on image-capture appliance 1. The configuration used is characterized in particular by:
the type of optical system 100,
the serial number of optical system 100 or any other designation.

Adjustments used are defined as:
the configuration used as defined hereinabove, as well as
the value of the manual or automatic adjustments available in the configuration used and having an impact on the content of image 103. These adjustments may be made by the user, especially by means of pushbuttons, or may be calculated by image-capture appliance 1. These adjustments may be stored in the appliance, especially on a removable medium, or on any device connected to the appliance. These adjustments may include in particular the adjustments of focusing, diaphragm and focal length of optical system 100, the adjustments of exposure time, the adjustments of white balance, and the integrated image-processing adjustments, such as digital zoom, compression and contrast.

Characteristics 74 used or set of characteristics 74 used are defined as:

a) Parameters related to the intrinsic technical characteristics of image-capture appliance 1, determined during the phase of design of image-capture appliance 1. For example, these parameters may include the formula of optical system 100 of the configuration used, which impacts the geometric defects and the sharpness of the captured images; the formula of optical system 100 of the configuration used includes in particular the shape, the arrangement and the material of the lenses of optical system 100.

These parameters may additionally include:
the geometry of sensor 101, or in other words sensor surface 110 as well as the shape and relative arrangement of pixels 104 on this surface,
the noise generated by electronic unit 102,
the equation for conversion of light flux to pixel value.

b) Parameters associated with the intrinsic technical characteristics of image-capture appliance 1, determined during the phase of manufacture of image-capture appliance 1 and, in particular:
the exact positioning of the lenses in optical system 100 of the configuration used,
the exact positioning of optical system 100 relative to sensor 101.

c) Parameters associated with the technical characteristics of image-capture appliance 1, determined at the moment of capture of image 103 and, in particular:
the position and orientation of sensor surface 110 relative to scene 3,
the adjustments used,
the external factors, such as temperature, if they have an influence.

d) The user's preferences, especially the color temperature to be used for image restitution. For example, these preferences are selected by the user by means of pushbuttons.

Observation Point, Observation Direction

Referring to FIG. 1, a description will now be given of what is understood by observation point 105 and observation direction 106.

Mathematical surface 10 is defined as a surface that is geometrically associated with sensor surface 110. For example, if the sensor surface is plane, it will be possible for mathematical surface 10 to coincide with the sensor surface.

Observation direction 106 is defined as a line passing through at least one point of scene 3 and through optical center 111. Observation point 105 is defined as the intersection of observation direction 106 and surface 10.

Observed Color, Observed Intensity

Referring to FIG. 1, a description will now be given of what is understood by observed color and observed intensity. Observed color is defined as the color of the light emitted, transmitted or reflected by the said scene 3 in the said observation direction 106 at a given instant, and observed from the said observation point 105. Observed intensity is defined as the intensity of the light emitted by the said scene 3 in the said observation direction 106 at the same instant, and observed from the said observation point 105.

The color can be characterized in particular by a light intensity that is a function of wavelength, or else by two values as measured by a colorimeter. The intensity can be characterized by a value such as measured with a photometer.

The said observed color and the said observed intensity depend in particular on the relative position of objects 107 in scene 3 and on the illumination sources present as well as on the transparency and reflection characteristics of objects 107 at the moment of observation.

Mathematical Projection, Mathematical Image, Mathematical Point, Mathematical Color of a Point, Mathematical Intensity of a Point, Mathematical Shape of a Point, Mathematical Position of a Point Referring in particular to FIGS. 1, 5, 9a, 9b, 9c and 9d, a description will be given of the concepts of mathematical projection 8, mathematical image 70, mathematical point, mathematical color of a point, mathematical intensity of a point, mathematical shape 41 of a point, and mathematical position 40 of a point.

Referring to FIG. 5, a description will now be given of how a mathematical image 70 is constructed by specified mathematical projection 8 of at least one scene 3 on mathematical surface 10.

Firstly, a description will be given of what is understood by specified mathematical projection 8.

A specified mathematical projection 8 associates a mathematical image 70 with:
a scene 3 at the moment of capture of an image 103,
and with the characteristics 74 used.

A specified mathematical projection 8 is a transformation with which the characteristics of each point of mathematical image 70 can be determined from scene 3 at the moment of image capture and from the characteristics 74 used.

Mathematical projection 8 is preferentially defined in the manner to be described hereinafter.

Mathematical position 40 of the point is defined as the position of observation point 105 on mathematical surface 10.

Mathematical shape 41 of the point is defined as the geometric, punctiform shape of observation point 105.

Mathematical color of the point is defined as the observed color.

Mathematical intensity of the point is defined as the observed intensity.

Mathematical point is defined as the association of mathematical position 40, mathematical shape 41, mathematical color and mathematical intensity for the observation point 105 under consideration. Mathematical image 70 is composed of the set of said mathematical points.

The mathematical projection 8 of scene 3 is mathematical image 70.

Real Projection, Real Point, Real Color of a Point, Real Intensity of a Point, Real Shape of a Point, Real Position of a Point Referring in particular to FIGS. 3, 5, 9a, 9b, 9c and 9d, a description will be given hereinafter of the concepts of real projection 72, real point, real color of a point, real intensity of a point, real shape 51 of a point, and real position 50 of a point.

During image capture, image-capture appliance 1 associates an image 103 of scene 3 with the characteristics 74 used. The light originating from scene 3 in an observation direction 106 passes through optical system 100 and arrives at sensor surface 110.

For the said observation direction, there is then obtained what is defined as a real point, which exhibits differences compared with the mathematical point.

Referring to FIGS. 9a to 9d, a description will now be given of the differences between the real point and the mathematical point.

The real shape 51 associated with the said observation direction 106 is not a point on the sensor surface, but it has the form of a cloud in three-dimensional space, where it has an intersection with one or more pixels 104. These differences are due in particular to coma, spherical aberration, astigmatism, grouping into pixels 104, chromatic aberration, depth of field, diffraction, parasitic reflections and field curvature of image-capture appliance 1. They give an impression of blurring, or of lack of sharpness of image 103.

In addition, real position 50 associated with the said observation direction 106 exhibits a difference compared with mathematical position 40 of a point. This difference is due in particular to the geometric distortion, which gives an impression of deformation: for example, vertical walls appear to be curved. It is also due to the fact that the number of pixels 104 is limited, and that consequently the real position 50 can have only a finite number of values.

In addition, the real intensity associated with the said observation direction 106 exhibits differences compared with the mathematical intensity of a point. These differences are due in particular to gamma and vignetting: for example, the edges of image 103 appear to be darker. Furthermore, noise may be added to the signal.

Finally, the real color associated with the said observation direction 106 exhibits differences compared with the mathematical color of a point. These differences are due in particular to gamma and the color cast. Furthermore, noise may be added to the signal.

A real point is defined as the association of the real position 50, the real shape 51, the real color and the real intensity for the observation direction 106 under consideration.

The real projection 72 of scene 3 is composed of the set of real points.

Parameterizable Transformation Model, Parameters, Corrected Image

A parameterizable transformation model 12 (or parameterizable transformation 12 for short) is defined as a mathematical transformation in which a corrected image 71 can be obtained from an image 103 and from the value of parameters. As indicated hereinbelow, the said parameters can in particular be calculated from the characteristics 74 used.

By means of the said transformation, it is possible in particular to determine, for each real point of image 103, the corrected position of the said real point, the corrected color of the said real point, the corrected intensity of the said real point, and the corrected shape of the said real point, from the value of the parameters, from the real position of the said real point and from the values of the pixels of image 103. As an example, the corrected position can be calculated by means of polynomials of fixed degree as a function of the real position, the coefficients of the polynomials depending on the value of the parameters. The corrected color and the corrected intensity can be, for example, weighted sums of the values of the pixels, the coefficients depending on the value of the parameters and on the real position, or else can be nonlinear functions of the values of the pixels of image 103.

The parameters can include in particular: the focal length of optical system 100 of the configuration used, or a related value such as the position of a group of lenses, the focusing of optical system 100 of the configuration used, or a related value such as the position of a group of lenses, the aperture of optical system 100 of the configuration used, or a related value such as the position of the diaphragm.

Difference Between the Mathematical Image and the Corrected Image

Referring to FIG. 5, the difference 73 between mathematical image 70 and corrected image 71 for a given scene 3 and given characteristics 74 used is defined as one or more values determined from numbers characterizing the position, color, intensity, and shape of all or part of the corrected points and of all or part of the mathematical points.

For example, the difference 73 between mathematical image and corrected image 71 for a given scene 3 and given characteristics 74 used can be determined as follows:

There are chosen characteristic points which, for example, may be the points of an orthogonal array 80 of regularly disposed points, as illustrated in FIG. 10.

The difference 73 is calculated, for example, by taking, for each characteristic point, the sum of the absolute values of the differences between each number characterizing position, color, intensity and shape respectively for the corrected point and for the mathematical point. The sum function of the absolute values of the differences may be replaced by another function such as the mean, the sum of the squares or any other function with which the numbers can be combined.

Reference Scene

A reference scene 9 is defined as a scene 3 for which certain characteristics are known. As an example, FIG. 4a shows a reference scene 9 composed of a paper sheet bearing regularly disposed, solid black circles. FIG. 4b shows another paper sheet bearing the same circles, with the addition of colored lines and areas. The circles are used to measure the real position 50 of a point, the lines to measure the real shape 51 of a point, and the colored areas to measure the real color of a point and the real intensity of a point. This reference scene 9 may be composed of a material other than paper.

Reference Image

Referring to FIG. 12, a definition will now be given of the concept of reference image 11. A reference image 11 is defined as an image of reference scene 9 obtained with image-capture appliance 1.

Synthetic Image, Synthetic-Image Class

Referring to FIG. 12, a definition will now be given of the concept of synthetic image and of synthetic-image class 7. A synthetic image is defined as a mathematical image 70 obtained by mathematical projection 8 of a reference scene 9. A synthetic-image class 7 is defined as a set of mathematical images 70 obtained by mathematical projection 8 of one or more reference scenes 9 for one or more sets of characteristics 74 used. In the case in which there is only one reference scene 9 and only one set of characteristics 74 used, the synthetic-image class 7 comprises only one synthetic image.

Transformed Image

Referring to FIG. 12, a definition will now be given of the concept of transformed image 13. A transformed image 13 is defined as the corrected image obtained by application of a parameterizable transformation model 12 to a reference image 11.

Transformed Image Close to a Synthetic-Image Class, Deviation

Referring to FIG. 12, a description will now be given of the concept of transformed image 13 close to a synthetic-image class 7 and of the concept of deviation 14.

The difference between a transformed image 13 and a synthetic-image class 7 is defined as the smallest difference between the said transformed image 13 and any one of the synthetic images of the said synthetic-image class.

A description will next be given of how to choose, among the parameterizable transformation models 12, that with which each reference image 11 can be transformed to a transformed image 13 close to the synthetic-image class 7 of the reference scene 9 corresponding to the said reference image 11, in different cases of reference scenes 9 and characteristics 74 used.

In the case of a given reference scene 9 associated with a set of given characteristics 74 used, there is chosen the parameterizable transformation 12 (and its parameters) with which the reference image 11 can be transformed to the transformed image 13 that exhibits the smallest difference compared with synthetic-image class 7. Synthetic-image class 7 and transformed image 13 are then said to be close. Deviation 14 is defined as the said difference.

In the case of a group of given reference scenes associated with sets of given characteristics 74 used, the parameterizable transformation 12 (and its parameters) is chosen as a function of the differences between the transformed image 13 of each reference scene 9 and the synthetic-image class 7 of each reference scene 9 under consideration. There is chosen the parameterizable transformation 12 (and its parameters) with which the reference images 11 can be transformed to transformed images 13 such that the sum of the said differences is minimized. The sum function may be replaced by another function such as the product. Synthetic-image class 7 and transformed images 13 are then said to be close. Deviation 14 is defined as a value obtained from the said differences, for example by calculating the mean thereof.

In the case in which certain characteristics 74 used are unknown, it is possible to determine them from the capture of a plurality of reference images 11 of at least one reference scene 9. In this case, there are simultaneously determined the unknown characteristics and the parameterizable transformation 12 (and its parameters) with which the reference images 11 can be transformed to transformed images 13, such that the sum of the said differences is minimized, in particular by iterative calculation or by solving equations concerning the sum of the said differences and/or their product and/or any other appropriate combination of the said differences. Synthetic-image class 7 and transformed images 13 are then said to be close. The unknown characteristics may be, for example, the relative positions and orientations of sensor surface 110 and of each reference scene 9 under consideration. Deviation 14 is defined as a value obtained from the said differences, for example by calculating the mean thereof.

Best Transformation

The best transformation is defined as the transformation with which, among the parameterizable transformation models 12, each reference image 11 can be transformed to a transformed image close to synthetic-image class 7 of the reference scene 9 corresponding to the said reference image 11, Calibration Calibration is defined as a method with which data related to the intrinsic characteristics of image-capture appliance 1 can be obtained, for one or more configurations used, each composed of an optical system 100 associated with an image-capture appliance 1.

Case 1: in the case in which there is only one configuration, the said method includes the following stages:

the stage of mounting the said optical system 100 on the said image-capture appliance 1, the stage of choosing one or more reference scenes 9,
the stage of choosing several characteristics 74 used,
the stage of capturing images of the said reference scenes 9 for the said characteristics used,
the stage of calculating the best transformation for each group of reference scenes 9 corresponding to the same characteristics 74 used.

Case 2: in the case in which all the configurations corresponding to a given image-capture appliance 1 and to all optical systems 100 of the same type are taken into consideration, the said method includes the following stages:
the stage of choosing one or more reference scenes 9,
the stage of choosing several characteristics 74 used,
the stage of calculating images 103 from characteristics 74 used and in particular from formulas for optical system 100 of the configuration used and from values of parameters, by means, for example, of software for calculating the optical system by ray tracing,
the stage of calculating the best transformation for each group of reference scenes 9 corresponding to the same characteristics used.

Case 3: in the case in which all the configurations corresponding to a given optical system 100 and to all the image-capture appliances 1 of the same type are taken into consideration, the said method includes the following stages:
the stage of mounting the said optical system 100 on an image-capture appliance 1 of the type under consideration,
the stage of choosing one or more reference scenes 9,
the stage of choosing several characteristics 74 used,
the stage of capturing images of the said reference scenes 9 for the said characteristics used,
the stage of calculating the best transformation for each group of reference scenes 9 corresponding to the same characteristics used.

Calibration can be performed preferentially by the manufacturer of image-capture appliance 1, for each appliance and configuration in case 1. This method is more precise but imposes more limitations and is highly suitable in the case in which optical system 100 is not interchangeable.

Alternatively, calibration can be performed by the manufacturer of image-capture appliance 1, for each appliance type and configuration in case 2. This method is less precise but is simpler.

Alternatively, calibration can be performed by the manufacturer of image-capture appliance 1, for each optical system 100 and type of appliance in case 3. This method is a compromise in which one optical system 100 can be used on all image-capture appliances 1 of one type, without repeating the calibration for each combination of image-capture appliance 1 and optical system 100.

Alternatively, calibration can be performed by the appliance seller or installer, for each image-capture appliance 1 and configuration in case 1.

Alternatively, calibration can be performed by the appliance seller or installer, for each optical system 100 and type of appliance in case 3.

Alternatively, calibration can be performed by the appliance user, for each appliance and configuration in case 1.

Alternatively, calibration can be performed by the appliance user, for each optical system 100 and type of appliance in case 3.

Design of the Digital Optical System

Design of the digital optical system is defined as a method for reducing the cost of optical system 100, by:
designing an optical system 100 having defects, especially in positioning of real points, or choosing the same from a catalog,
reducing the number of lenses, and/or
simplifying the shape of the lenses, and/or
using less expensive materials, processing operations or manufacturing processes.

The said method includes the following stages:
the stage of choosing an acceptable difference (within the meaning defined hereinabove),
the stage of choosing one or more reference scenes 9,
the stage of choosing several characteristics 74 used.

The said method also includes iteration of the following stages:
the stage of choosing an optical formula that includes in particular the shape, material and arrangement of the lenses,
the stage of calculating images 103 from the characteristics 74 used and in particular from the formulas for optical system 100 of the configuration used, by employing, for example, software for calculating the optical system by ray tracing, or by making measurements on a prototype,
the stage of calculating the best transformation for each group of reference scenes 9 corresponding to the same characteristics 74 used,
the stage of verifying if the difference is acceptable, until the difference is acceptable.

Formatted Information

Formatted information 15 associated with image 103, or formatted information 15, is defined as all or part of the following data:
data related to the intrinsic technical characteristics of image-capture appliance 1, especially the distortion characteristics, and/or
data related to the technical characteristics of image-capture appliance 1 at the moment of image capture, especially the exposure time, and/or
data related to the preferences of the said user, especially the color temperature, and/or
data related to the deviations 14.

Database of Characteristics

A database 22 of characteristics or database 22 is defined as a database containing formatted information 15 for one or more image-capture appliances 1 and for one or more images 103.

The said database 22 of characteristics can be stored in centralized or distributed manner, and in particular can be:
integrated into image-capture appliance 1,
integrated into optical system 100, integrated into a removable storage device,
integrated into a PC or other computer connected to the other elements during image capture,
integrated into a PC or other computer connected to the other elements after image capture,
integrated into a PC or other computer capable of reading a storage medium shared with image-capture appliance 1,
integrated into a remote server connected to a PC or other computer, itself connected to the other image-capture elements.

Fields

Referring to FIG. 8, a definition will now be given of the concept of fields 90. The formatted information 15 associated with image 103 can be recorded in several forms and structured into one or more tables, but it corresponds logically to all or part of fields 90, comprising:

(a) the focal distance,
(b) the depth of field
(c) the geometric defects.

The said geometric defects include geometric defects of image 103 characterized by the parameters associated with the filming characteristics 74 and a parameterizable transformation representing the characteristics of image-capture appliance 1 at the moment of filming. By means of the said parameters and of the said parameterizable transformation, it is possible to calculate the corrected position of a point of image 103.

The said geometric defects also include the vignetting characterized by the parameters associated with filming characteristics 74 and a parameterizable transformation representing the characteristics of image-capture appliance 1 at the moment of filming. By means of the said parameters and the said parameterizable transformation, it is possible to calculate the corrected intensity of a point of image 103.

The said geometric defects also include the color cast characterized by the parameters associated with filming characteristics 74 and a parameterizable transformation representing the characteristics of image-capture appliance 1 at the moment of filming. By means of the said parameters and the said parameterizable transformation, it is possible to calculate the corrected color of a point of image 103.

The said fields 90 also include (d) the sharpness of image 103.

The said sharpness includes the blurring in resolution of image 103 characterized by the parameters associated with filming characteristics 74 and a parameterizable transformation representing the characteristics of image-capture appliance 1 at the moment of filming. By means of the said parameters and the said parameterizable transformation, it is possible to calculate the corrected shape of a point of image 103. Blurring covers in particular coma, spherical aberration, astigmatism, grouping into pixels 104, chromatic aberration, depth of field, diffraction, parasitic reflections and field curvature.

The said sharpness also includes the blurring in depth of field, in particular spherical aberrations, coma and astigmatism. The said blurring depends on the distance of the points of scene 3 relative to image-capture appliance 1, and it is characterized by the parameters associated with filming characteristics 74 and a parameterizable transformation representing the characteristics of image-capture appliance 1 at the moment of filming. By means of the said parameters and of the said parameterizable transformation, it is possible to calculate the corrected shape of a point of image 103.

The said fields 90 also include (e) parameters of the quantization method. The said parameters depend on the geometry and physics of sensor 101, on the architecture of electronic unit 102 and on any processing software that may be used.

The said parameters include a function that represents the variations of intensity of a pixel 104 as a function of wavelength and light flux derived from the said scene 3. The said function includes in particular gamma information.

The said parameters also include:
the geometry of the said sensor 101, especially the shape, the relative position and the number of sensitive elements of the said sensor 101,
a function representative of the spatial and temporal distribution of noise of image-capture appliance 1,
a value representative of the exposure time for image capture.

The said fields 90 also include (f) parameters of the digital-processing operations performed by image-capture appliance 1, especially digital zoom and compression. These parameters depend on the processing software of image-capture appliance 1 and on the user's adjustments.

The said fields 90 also include:

(g) parameters representative of the user's preferences, especially as regards the degree of blurring and the resolution of image 103.

(h) the deviations 14.

Calculation of Formatted Information

The formatted information 15 can be calculated and recorded in database 22 in several stages.

a) A stage at the end of design of image-capture appliance 1.

By means of this stage it is possible to obtain intrinsic technical characteristics of image-capture appliance 1, and in particular:
the spatial and temporal distribution of the noise generated by electronic unit 102,
the formula for conversion of light flux to pixel value,
the geometry of sensor 101.

b) A stage at the end of calibration or design of the digital optical system.

By means of this stage it is possible to obtain other intrinsic technical characteristics of image-capture appliance 1, and in particular, for a certain number of values of characteristics used, the best associated transformation and the associated deviation 14.

c) A stage in which the user's preferences are chosen by means of pushbuttons, menus or removable media, or of connection to another device.

d) An image capture stage.

By means of this stage (d) it is possible to obtain technical characteristics of image-capture appliance 1 at the moment of image capture, and in particular the exposure time, which is determined by the manual or automatic adjustments made.

By means of stage (d) it is also possible to obtain the focal distance. The focal distance is calculated from:
a measurement of the position of the group of lenses of variable focal length of optical system 100 of the configuration used, or
a set value input to the positioning motor, or
a manufacturer's value if the focal length is fixed.

The said focal distance can then be determined by analysis of the content of image 103.

By means of stage (d) it is also possible to obtain the depth of field. The depth of field is calculated from:
a measurement of the position of the group of focusing lenses of optical system 100 of the configuration used, or
a set value input to the positioning motor, or
a manufacturer's value if the depth of field is fixed.

By means of stage (d) it is also possible to obtain the defects of geometry and of sharpness. The defects of geometry and of sharpness correspond to a transformation calculated by means of a combination of transformations of the database 22 of characteristics obtained at the end of stage (b). This combination is chosen to represent the values of parameters corresponding to the characteristics 74 used, especially the focal distance.

By means of stage (d) it is also possible to obtain the parameters of digital processing performed by image-capture appliance 1. These parameters are determined by the manual or automatic adjustments made.

The calculation of formatted information 15 according to stages (a) to (d) can be performed by:
  a device or software integrated into image-capture appliance 1, and/or
  driver software in a PC or other computer, and/or
  software in a PC or other computer, and/or
  a combination of the three.

The foregoing transformations in stage (b) and stage (d) can be stored in the form of:
  a general mathematical formula,
  a mathematical formula for each point,
  a mathematical formula for certain characteristic points.

The mathematical formulas can be described by:
  a list of coefficients,
  a list of coefficients and coordinates.

By means of these different methods it is possible to reach a compromise between the size of the memory available for storage of the formulas and the calculating power available for calculation of the corrected images 71.

In addition, in order to retrieve the data, identifiers associated with the data are recorded in database 22. These identifiers include in particular:
  an identifier of the type and of the reference of image-capture appliance 1,
  an identifier of the type and of the reference of optical system 100, if it is removable,
  an identifier of the type and of the reference of any other removable element having a link to the stored information,
  an identifier of image 103,
  an identifier of the formatted information 15.

Completed Image

As described by FIG. 11, a completed image 120 is defined as the image 103 associated with the formatted information 15. This completed image 120 can preferentially have the form of a file. Completed image 120 can also be distributed into a plurality of files.

Completed image 120 can be calculated by image-capture appliance 1. It can also be calculated by an external calculating device, such as a computer.

Image-Processing Software

Image-processing software 4 is defined as software that accepts one or more completed images 120 as input and that performs processing operations on these images. These processing operations can include in particular:
  calculating a corrected image 71,
  performing measurements in the real world,
  combining several images,
  improving the fidelity of the images relative to the real world,
  improving the subjective quality of images,
  detecting objects or persons 107 in a scene 3,
  adding objects or persons 107 to a scene 3,
  replacing or modifying objects or persons 107 in a scene 3,
  removing shadows from a scene 3,
  adding shadows to a scene 3,
  searching for objects in an image base.

The said image-processing software can be:
  integrated into image-capture appliance 1,
  run on calculating means 17 connected to image-capture appliance 1 by transmission means 18.

Digital Optical System

A digital optical system is defined as the combination of an image-capture appliance 1, a database 22 of characteristics and a calculating means 17 that permits:
  image capture of an image 103,
  calculation of the completed image,
  calculation of the corrected image 71.

Preferentially, the user obtains corrected image 71 directly. If he wishes, the user may demand suppression of automatic correction.

The database 22 of characteristics may be:
  integrated into image-capture appliance 1,
  integrated into a PC or other computer connected to the other elements during image capture,
  integrated into a PC or other computer connected to the other elements after image capture,
  integrated into a PC or other computer capable of reading a storage medium shared with image-capture appliance 1,
  integrated into a remote server connected to a PC or other computer, itself connected to the other image-capture elements.

Calculating means 17 may be:
  integrated onto a component together with sensor 101,
  integrated onto a component together with part of electronics unit 102,
  integrated into image-capture appliance 1,
  integrated into a PC or other computer connected to the other elements during image capture,
  integrated into a PC or other computer connected to the other elements after image capture,
  integrated into a PC or other computer capable of reading a storage medium shared with image-capture appliance 1,
  integrated into a remote server connected to a PC or other computer, itself connected to the other image-capture elements.

Processing of the Complete Chain

The foregoing paragraphs have essentially presented precise details of the concepts and description of the method and system according to the invention for providing, to image-processing software 4, formatted information 15 related to the characteristics of image-capture appliance 1.

In the paragraphs to follow, an expanded definition will be given of the concepts and a supplemented description will be given of the method and system according to the invention for providing, to image-processing software 4, formatted information 15 related to the characteristics of image-restitution means 19. In this way the processing of a complete chain will be explained.

By means of the processing of the complete chain, it is possible:
  to improve the quality of image 103 from one end of the chain to the other, to obtain a restituted image 191 while correcting the defects of image-capture appliance 1 and of image-restitution means 19, and/or
  to use optical systems of lower quality and of lower cost in a video projector in combination with software for improvement of image quality.

Definitions Associated with the Image-Restitution Means

On the basis of FIGS. 2 and 6, a description will now be given of how the characteristics of an image-restitution means 19 such as a printer, a visual display screen or a projector are taken into account in the formatted information 15.

The supplements or modifications to be made to the definitions in the case of an image-restitution means 19 may be inferred by analogy by a person skilled in the art by analogy with the definitions provided in the case of an image-capture appliance 1. Nevertheless, in order to illustrate this method, a description with reference in particular to FIG. 6 will now be given of the main supplements or modifications.

By restitution characteristics 95 used there are designated the intrinsic characteristics of image-restitution means 19, the characteristics of image-restitution means 19 at the moment of image restitution, and the user's preferences at the moment of image restitution. In the case of a projector in particular, the restitution characteristics 95 used include the shape and position of the screen used.

By parameterizable restitution transformation model 97 (or parameterizable restitution transformation 97 for short), there is designated a mathematical transformation similar to parameterizable transformation model 12.

By corrected restitution image 94 there is designated the image obtained by application of parameterizable restitution transformation 97 to image 103.

By mathematical restitution projection 96 there is designated a mathematical projection that associates, with a corrected restitution image 94, a mathematical restitution image on the mathematical restitution surface geometrically associated with the surface of restitution medium 190. The mathematical restitution points of the mathematical restitution surface have a shape, position, color and intensity calculated from corrected restitution image 94.

By real restitution projection 90 there is designated a projection that associates a restituted image 191 with an image 103. The pixel values of image 103 are converted by the electronic unit of restitution means 19 to a signal that drives the modulator of restitution means 19. Real restitution points are obtained on restitution medium 190. The said real restitution points are characterized by shape, color, intensity and position. The phenomenon of grouping into pixels 104 described hereinabove in the case of an image-capture appliance 1 does not occur in the case of an image-restitution means. On the other hand, an inverse phenomenon occurs, with the result in particular that lines take on a staircase appearance.

Restitution difference 93 is designated as the difference between restituted image 191 and mathematical restitution image 92. This restitution difference 93 is obtained by analogy with difference 73.

By restitution reference there is designated an image 103 in which the values of pixels 104 are known.

By best restitution transformation there is designated for a restitution reference and the restitution characteristics 95 used, that with which image 103 can be transformed to a corrected restitution image 94 such that its mathematical restitution projection 92 exhibits the minimum restitution difference 93 compared with restituted image 191.

The methods of restitution calibration and of design of the digital optical restitution system are comparable with the methods of calibration and of design of the digital optical system in the case of an image-capture appliance 1. Nevertheless, differences are present in certain stages, and in particular the following stages:
- the stage of choosing a restitution reference;
- the stage of performing restitution of the said restitution reference;
- the stage of calculating the best restitution transformation.

The formatted information 15 related to an image-capture appliance 1 and that related to an image-restitution means 19 can be used end-to-end for the same image.

In the foregoing, a description was given of the concept of field in the case of an image-capture appliance 1. This concept is also applicable by analogy in the case of image-restitution means 19. Nonetheless the parameters of the quantization method are replaced by the parameters of the signal-reconstitution method, meaning: the geometry of restitution medium 190 and its position, a function representing the spatial and temporal distribution of the noise of image-restitution means 19.

Generalization of the Concepts

The technical features of which the invention is composed and which are specified in the claims have been defined, described and illustrated by referring essentially to image-capture appliances of digital type, or in other words appliances that produce digital images. It can be easily understood that the same technical features are applicable in the case of image-capture appliances that would be the combination of an appliance based on silver technology (a photographic or cinematographic appliance using sensitive silver halide films, negatives or reversal films) with a scanner for producing a digital image from the developed sensitive films. Certainly it is appropriate in this case to adapt at least some of the definitions used. Such adaptations are within the capability of the person skilled in the art. In order to demonstrate the obvious character of such adaptations, it is merely necessary to mention that the concepts of pixel and pixel value illustrated by referring to FIG. 3 must, in the case of the combination of an appliance based on silver technology with a scanner, be applied to an elemental zone of the surface of the film after this has been digitized by means of the scanner. Such transpositions of definitions are self-evident and can be extended to the concept of the configuration used. As an example, the list of removable subassemblies of image-capture appliance 1 included in the configuration used can be supplemented by the type of photographic film effectively used in the appliance based on silver technology.

Automatic Modification of the Quality of an Image

Referring to FIGS. 17, 13a, 13b and 13c, a description will be given of a practical example of the method and system according to the invention for automatic modification of the quality of an image P2 derived from or addressed to an appliance chain P3, which is also defined as the specified appliance chain.

In the practical example, the system according to the invention includes data-processing means P76 to perform, for image P2, the following stages of the method according to the invention:
- the stage of compiling directories of the sources P50 of formatted information 15 related to the appliances of set P75 of appliances; these sources P50 may be in particular, depending on the case, image file P58 containing image P2, the appliances, a local and/or remote database 22, and means P53 for loading image P2 or the modified image, an example being Twain-compliant software used for a scanner; the sources compiled in this way are defined as database 22, the stage of searching automatically, among the said formatted information 15 compiled in this way, for specific formatted information P51 related to the said specified appliance chain P3; a source can be used to update database 22, for example via the Internet, in the case in which the search for specific formatted information P51 is unsuccessful for one of the appliances, the stage of calculating the unknown formatted information, for example by measuring the defects of the appliance, or by simulating the appliance, or by calibrating the appliance according to the method described hereinabove, the stage of modifying the said image P2 automatically by means of image-processing software P64 and/or image-processing components P65, by taking into account the said specific formatted information P51 obtained in this way.

By way of example, the method and system according to the invention will be described for the application of restitution of an image of an image-capture appliance, whether it be a photographic appliance, a video filming appliance, an echographic appliance, etc. Under these conditions, it will be possible to use the characteristics of the filming appliance (especially of optical type), of the sensor or photosensitive surface (CCD, photosensitive film, etc.), of the scanner, of the processing software, of the information-transmission chain between the different appliances and of the printer for restitution of an image of such an appliance. As will be seen hereinafter, it will be possible to use other elements having their own particular characteristics in the image chain.

Each appliance is characterized by an identifier 60, by means of which it is possible to identify the type of appliance and therefore to access the known characteristics related to this type of appliance and indirectly to obtain indices P52, the use of which will be described hereinafter.

Certain appliances may be subject to special operating adjustments. For example, a capture appliance may be adjusted as a function of the filming conditions, or a printer may be set to enlargement mode, etc. These particular modes of operation lead to variable characteristics P55, which can be employed within the scope of the invention. Furthermore, these variable characteristics P55 may influence the fixed characteristics (or original characteristics) of the appliance or of the appliance chain P3.

FIG. 13a illustrates a diagram of a practical example of the system of the invention.

In the upper part of this diagram there are illustrated appliances or devices, which will be defined as peripheral appliances, which provide information, images and data to the system:

What is involved is:

an image 1 to be processed, which obviously contains image information 61 but can also include data 62 concerning characteristics of the filming medium and characteristics that provide information on the image-capture conditions or on subsequent manipulations of the image (examples being the focal length used, or the redimensioning of the image). These characteristics will be treated as variable characteristics 66 in the description hereinafter. The variable characteristics may also be contained in the image itself or may be calculated from the image.

an image-capture appliance APP1, which possesses inherent characteristics and which may contain variable characteristics 66. The inherent characteristics are related to the type of appliance or to each appliance, and they may be known through knowledge of the appliance and of its original characteristics. In particular, they may be known from its identifier 60, which may be, for example, a bar code on the appliance or on a film, and with which the system will associate these inherent characteristics. Identifier 60 can be obtained in various ways from the image, from the data 62, and/or by interrogating the management software of the appliance, or the appliance itself, or the user, which are symbolized by LOG/MAT/IMPR in FIG. 13a. Variable characteristics 66 are generally related to the image-capture conditions, and may be those mentioned hereinabove, which may be contained in the image, or in the image-capture appliance or in both at the same time:

peripherals APP2 to APPn including in particular a peripheral APP2 such as a printer or a scanner that has characteristics related to the type of appliance and in particular reflecting their defects, as well as variable characteristics 66 related to the mode of use, examples being the enlargement factor for a printer. A peripheral such as APPn may also be a pseudo-peripheral and have the form of a file representing the appliances or the functionalities and containing the characteristics corresponding to these appliances or these functionalities:

an image-capture appliance, an image-restitution appliance, an image-capture appliance which is different from appliance APP1, for simulating photographs taken by that appliance, and which can be referred to by the English term "lookalike", a simulation of an image-capture appliance which is different from appliance APP1, for substituting for the appliance mentioned hereinabove, and which, by analogy with the preceding case, can be referred to by the term virtual "lookalike", characteristics with which the quality of an image can be modified by taking into account vision defects of the eye of the user, or with which special effects can be created, characteristics with which software defects can be corrected or modified, such as blurring induced by digital zoom, software which performs processing on the image and introduces defects, or which is provided with variable characteristics 66, such as recoding or zoom, installation characteristics, especially for a projector, which are related to the error of square-on frontality or of flatness of the screen, and which can be measured by a camera, for example, a combination of a plurality of appliances such as described hereinabove.

These different devices APP1 to APPn as well as image 1 comprise an appliance chain P3. The processing of an image will take into consideration not only its inherent defects but also the defects of the different appliances all of which will have an action on the image. The set of these devices will be defined as appliance chain P3. The purpose of the system is to correct or modify the defects introduced by each device of the chain into processing of the image.

Examples of the variable characteristics 66 that can be appropriately taken into account include:
   the focal length of the optical system,
   the redimensioning applied to the image (digital zoom factor: enlargement of part of the image; and/or undersampling: reduction of the number of pixels of the image),
   the nonlinear brightness correction, such as the gamma correction,
   the enhancement of contour, such as the level of deblurring applied by appliance,
   the noise of the sensor and of the electronic unit,
   the aperture of the optical system,
   the focusing distance,
   the number of the frame on a film,
   the underexposure or overexposure,
   the sensitivity of the film or sensor,
   the type of paper used in a printer,
   the position of the center of the sensor in the image,
   the rotation of the image relative to the sensor,
   the position of a projector relative to the screen,
   the white balance used,
   the activation of a flash and/or its power,
   the exposure time,
   the sensor gain,
   the compression,
   the contrast,
   another adjustment applied by the user of appliance, such as a mode of operation,
   another automatic adjustment of appliance,
   another measurement performed by appliance.

The system possesses receiving interfaces C.VAR1, C.VAR2, . . . C.VARn designed to receive the variable characteristics 66 explained hereinabove. The characteristics derived from the image can be transmitted by the image itself or, as mentioned hereinabove, by the data associated with the image. It is recalled that the variable characteristics 66 of the image can also be transmitted by the image-capture appliance.

Interfaces ID1, ID2, . . . IDn are designed to receive the identifiers 60 of the different peripherals APP1 to APPn.

Depending on the case, the concept of peripheral may correspond to one or more appliances, which may or may not be of the same type. The following examples, each accompanied by a possible implementation of identifier 60 in the form of a coding and of a content, correspond to several of these cases:
   to a given peripheral (for example, coding IA1: manufacturer's name, type of peripheral, serial number of the peripheral),
   to a given type of peripheral (for example, coding IA2: manufacturer's name, type of peripheral),
   to a given configuration (for example, coding IA3: manufacturer's name, type of peripheral, type of interchangeable objective mounted),
   to a category of peripheral (for example, coding IA4, adapted to disposable photo appliances: manufacturer's name, type of appliance, frame number),
   to a manufacturer (for example, coding IA5, for a manufacturer),
   to a plurality of peripherals of a chain (for example, coding IA6 in an equipment item for photographic printing, items of formatted information related to a disposable appliance are imported and combined with those of the scanner and printer, for storage in a local database related to the chain, adapted identifiers 60 are needed),
   to an algorithm, such as a zoom algorithm (for example, coding IA7: name of the algorithm, implementation, field indicating whether image quality is to be modified before or after the algorithm),
   to a human being whose vision defects are to be corrected or modified (for example, coding IA8: name of the person, country),
   to a peripheral to be emulated and to which defects must be added and not suppressed (for example, coding IA9: manufacturer's name, type of appliance),
   to a given peripheral version (for example, coding IA10: manufacturer's name, type of peripheral, version of the software of the peripheral),
   to a protocol (for example, coding IA11: data derived from the Twain protocol),
   to a generic peripheral (for example, coding IA12: list of data sources, field identifier; field value), The system can then analyze the peripherals or appliances of appliance chain P3 and determine the identifiers 60 in various ways depending on the case, in order to be able to interrogate the database.

A database contains, for each type of appliance, at least one item of formatted information representing the defects and the characteristics of that appliance. The formatted information 15 may be related to the defects P5 of the appliance in various ways. It may represent the defects of the appliance. It may represent the inverse of the defects of the appliance. It may represent merely an approximation of the defects. It may represent the deviation between the defects of two appliances. From each identifier 60 provided by an interface such as interface ID1 it is possible to obtain an item of formatted information such as 15.1, which is received temporarily in a circuit 20.1. Formatted information related to appliances APP1, APP2, APPn can be received in circuits 20.1, 20.2, . . . 20.*n*.

The database may be integrated into the system or may be at least partly remote.

In this case it can be managed by a third party, at least partly.

In the case, for example, of a digital photo appliance that corrects or modifies its inherent defects, the database can be reduced to a registration.

Operators 21.1, 21.2, 21.*n* for processing formatted information are designed to receive part of the values of the variable characteristics 66 provided by interfaces C.VAR1 to C.VARn as well as the formatted information provided by circuits 20.1 to 20.N in such a way that each operator processes a fraction of the formatted information by means of one or more variable characteristics 66 and provides an item of modified formatted information to an intermediate circuit 22.1 to 22.*n*. For example, operator 21.1 receives the item of formatted information 15.1 depending on focal length, processes it by means of the value of variable characteristic 66 (the value of the focal length) provided by interface C.VAR1, and provides an item of modified formatted information 15.1' that does not depend on focal length. As an example, FIG. 16.1 illustrates an appliance possessing characteristics that cause defects 704 to become apparent, leading in turn to formatted information 15, as seen hereinabove. Variable characteristics 66 that represent a variable focal length 705, for example, also lead to formatted information (see FIG. 16.2).

Image-processing operators 23.1, 23.2, . . . 23.*n* are each designed to receive an item of modified formatted information. The first operator 23.1 receives an image to be processed, processes it by means of the item of modified formatted information 15.1', and provides a modified image.

This is received by the following operator 23.2, which processes it by means of the item of modified formatted information 15.2' and provides a new modified image, and so on until the last operator 23.*n*, which provides a final modified image.

Possibly, if an image-processing operator does not receive any modified formatted information, the image received by such an operator is not modified and is transmitted as is to the following operator or to the output or, for example, default formatted information may be used.

Finally, the entire operation of the system, and in particular the exchange of information and data between the different elements of the system, can be managed by a central control unit 25.

Under these conditions, central control unit 25 will be in charge of searching automatically, within database 22, for formatted information having addresses that are given by interfaces ID1, ID2, IDn. Central unit 25 manages the search for this information and activates operators 21.1 to 21.*n* for processing the formatted information and then image-processing operators 23.1 to 23.*n*. If necessary, the operators may be located on different remote but interconnected systems.

FIG. 13*b* represents an alternative embodiment of the system according to the invention. In this alternative embodiment, the items of modified formatted information are combined into a single item of formatted information, and they modify the quality of the image to be processed. For this purpose, one operator 23.*t* replaces the operators 23.1 to 23.*n*. That operator receives and combines the different items of modified formatted information, and makes it possible to modify the quality of the image to be processed, in order to provide a modified image.

Furthermore, according to an alternative embodiment that is also applicable to the system of FIG. 13*a*, it is provided, as indicated in FIG. 13*c*, that the variable characteristics 66 of an appliance and its identifier 60 be combined to enable direct access within database 22 to an item of modified formatted information. For example, the variable characteristics 66 provided by C.VAR1 are combined with an identifier ID1 to form an item of modified formatted information 15.1, which is transmitted to 22.1. It is clear that in FIG. 13*c*, this arrangement is provided only for the item of modified formatted information 15.1', but it could be applied to all or part of the other formatted information. The system provides a modified image at the output of operator 23.*n* for FIGS. 13*a* and 23. and for FIGS. 13*b* and 13*c*. FIG. 16.5 illustrates the case in which, to a modified image 61*c*, there is added associated information 62*c*, which can be:
- a digital signature of the image,
- correction data, or in other words modified formatted information or its equivalent, or simply an indicator, thus indicating that the image has been corrected or modified,
- the data 62 or information P63 associated with original image 1, modified or updated if necessary to reflect the processing operations applied to the image, examples being data in Exif or PIM format,
- or both types of data.

The practical examples of FIGS. 13*a* to 13*c* can be applied to all of the defects or to each defect.

For example, it is possible to correct the distortion and blurring of appliance APP1, then the distortion and blurring of APP2, etc.

According to another example, it is also possible to correct distortion of APP1, then distortion of APP2, etc., then blurring of APP1, then blurring of APP2, etc.

By generalizing in the case of a plurality of defects and a plurality of appliances, it is possible to combine the approaches of both embodiments.

Referring to FIG. 14*a*, a description will now be given of a simplified practical example of the methods of the invention. This practical example is applied to an image-capture appliance. It is assumed that the method is required to modify only the defects due to a single appliance, such as the image-capture appliance, and due to the adjustments of that appliance.

As an example, the image is made available for processing in digitized form by a digitizing device 400.1, by a digital capture appliance 400.2 (digital photo appliance, or scanner, or other appliance), or by a compact disk 400.3.

In stage 401 of the method, a digitized image is available. In addition, the characteristics of the image-capture appliance and even the type of this appliance are known through any identification means, such as a bar code.

In stage 402 of the method, identifier 60 of the appliance is acquired or calculated.

In stage 403, database 22 of the characteristics of the image-capture appliance can be accessed via identifier 60, for example by means of index P52. In fact, as mentioned hereinabove, a database is available in which appliance characteristics have in principle been registered for every known appliance. Within the scope of the invention, these characteristics represent the defects to be modified. Thus database 22 is called in stage 403. In an alternative embodiment, the call to the database may additionally take into account certain variable characteristics 66 obtained during stage 405, in order to obtain directly the formatted information that is pertinent for the values obtained in this way for variable characteristics 66.

In stage 404, an item of formatted information 15 that represents the characteristics (defects) of the corresponding appliance is read in database 22 at an address obtained from identifier 60.

Furthermore, along with the image to be processed, the system may be provided if necessary with variable characteristics (filming conditions in particular) from a memory of the appliance, from software related to the appliance, or from information associated with the image.

These characteristics are therefore available in stage 405.

Thereafter (stage 406), the formatted information 15.1 to 15.*n* is combined with the variable characteristics 66 to provide modified formatted information 15.1' to 15.*n*'. This modified formatted information now contains all of the information with which the quality of the image can be modified.

According to an alternative version of this stage 406, if the variable characteristics 66 and in particular their values for the image to be processed have been determined, they are used to determine, within the formatted information, a fraction of this formatted information that takes into account these variable characteristics 66.

In stage 407, this modified formatted information is applied to the image in order to process it and to correct or modify it. This processing is performed by means of operators assisted by image-processing software.

In this way a modified image is obtained in stage 408.

It is quite evident that the foregoing method can function by using only the characteristics inherent to the appliance without using the variable characteristics 66. In this case the formatted data read in the database are used directly to process the image.

Referring to FIG. 14*b*, a description will now be given of another practical example of the invention. In this method and system, it is assumed that there is reason to take into account the diverse defects of a plurality of appliances, and even those of all the appliances involved in the processing of an image.

As in the example of FIG. 14a, the method provides for acquisition by the system of the digitized image, of the identifiers 60 of the appliances and of the variable characteristics 66.

During stage 501, the identifier 60 of an appliance is taken into account, and makes it possible to address database 22 (stage 502) in order to obtain one or more items of formatted information corresponding to this identifier 60.

A search is also made for the variable characteristics 66 related to this appliance (stage 504).

During stage 505, the formatted information or certain items of formatted information are modified as a function of the characteristic variables 66. As in the method described in connection with FIG. 14b, once the variable characteristics 66 have been determined, they can be used to determine, among the formatted information, that which is useful and which takes into account the variable characteristics 66. The formatted information determined in this way is stored in memory.

Thereafter (stage 506), a test is performed to decide whether another appliance must be taken into account for modification of the quality of the image. In the diagram of FIG. 4b, this test is represented in the form of the question "APP=APPn?", meaning: "is the appliance being taken into account the last of the appliances of the chain?". If the answer is negative, the process repeats stage 501 with the next appliance. If the answer is positive, it means that all of the formatted information related to the different appliances is in memory at the end of stage 505.

The image is then processed in the course of stage 507 by formatted information related to the first appliance, and leads to a first processed image. The system then takes into account the formatted information related to the next appliance and processes the previously processed image, and so on until all of the formatted information has been processed, which in principle means until all the information related to the different appliances of the chain has been taken into account. The test "APP=APPn?" then responds positively. A modified image is obtained and delivered.

It will be noted that the method of the invention can be implemented by performing only a single test "APP=APPn?". It would be possible to perform only the test of stage 508, which would achieve almost the same result.

In an alternative version of the method according to the invention, as illustrated in FIG. 14c, it is provided that the different items of formatted information be combined in the course of stage 510, after all of the formatted information of all of the appliances has been obtained, or in other words on completion of stage 506. In this way, image processing is performed one time during stage 507. As has been seen hereinabove, for an image to be processed, there may be needed a plurality of appliances, possibly including the image-capture appliance, a scanner, a printer, transmission systems, etc. Each appliance is capable of inducing defects in the processing chain. There may also be needed additional arrangements, which were defined hereinabove as "pseudo-peripherals" and which are intended to make modifications to the image in accordance with a style or by application of defects that correspond to these pseudo-peripherals.

In an alternative version of the method of the invention, it is considered that the set of appliances that, in an appliance chain P3, are necessary for processing an image, is composed of a single appliance, which will be defined as virtual appliance 708 and whose defects correspond to the equivalent of all or part of the defects of the different appliances of the chain. Thus appliances such as an image-capture appliance 706 (FIG. 16.4) and a printer 707 can be represented by one virtual appliance 708, to which there corresponds virtual formatted information 709. If it is considered that an item of formatted information can be a mathematical expression of physical characteristics, an item of formatted information of a virtual appliance 708 corresponding to two appliances can be the sum of two vectors corresponding to the characteristics of these two appliances and/or to the convolution of two mathematical functions. According to FIG. 16.4, there is therefore determined a virtual appliance 708 that exhibits defects equivalent to at least part of the original defects of the chain. The virtual formatted information 709 corresponding to this virtual appliance is determined. And the virtual formatted information obtained is registered, or else this virtual formatted information is substituted for the formatted information related to the original defects. The virtual formatted information can be accessed directly in the database by means of an identifier 60 corresponding to the appliance chain P3 represented by the virtual appliance. Execution of the method can then be achieved more simply and more rapidly.

An example of organization of the method with which virtual formatted information can be obtained may be employed according to the organizational diagram of FIG. 15. The characteristics of two appliances are taken into account (stages 510 and 511). These characteristics are combined in stage 512. The corresponding virtual formatted information is calculated in stage 513. In stage 514, it is checked whether another appliance is needed in the virtual appliance chain. If yes, the process is repeated. If no, the process is terminated.

In the example of an integrated development laboratory, appliance chain P3 comprises a scanner, a photo appliance and a printer. The equivalent virtual appliance exhibits the defects of the three appliances, and the time for modification of the quality of the image may be divided substantially by three.

In the case of an appliance with variable characteristics 66, it is possible to determine the formatted information related to defects that exhibit the said variable characteristic 66 in the following manner.

In the example in which the variable characteristics 66 are the focal length and the aperture, combinations are selected:
focal length=35 mm, aperture=f/2,
focal length=35 mm, aperture=f/8,
focal length=100 mm, aperture=f/8,
etc.

For each combination, the corresponding formatted information is determined by the method described hereinabove.

Formatted information that is a function of the focal length and aperture is deduced, for example by interpolation, in such a way that the database contains the formatted information necessary in stage 404.

It is therefore seen, as was seen hereinabove during the description of FIG. 13a, that an item of formatted information depending on a variable characteristic 66 such as the focal length is available. This item of formatted information is processed by means of the variable characteristic 66 to obtain an item of modified formatted information.

In the foregoing description, it was considered that the image to be processed was an image derived from an image-capture appliance, and was to be displayed or printed. The invention is also applicable to any image-processing chain and thus also to a chain with which an image can be projected. Thus an image-restitution chain will now be considered. As in the foregoing practical examples of the method of the invention, the characteristics of the different appliances of the image-restitution chain must be obtained. By means of these characteristics it is possible to obtain formatted information for application of the method of the invention.

A description will now be given of elements of detail or of alternative revisions of the invention.

Firstly, during the description of FIG. 13a, it was mentioned that the provided characteristics making it possible to obtain formatted information could be characteristics designed to correct vision defects (such as astigmatism) of an observer 701, or to induce special effects. Under these conditions, the resulting formatted information 702 makes it possible to modify the visual, graphic, colorimetric and other quality of the image; as illustrated by FIG. 16.3, the formatted information 702 related to vision defects of observer 701, for example, is processed as formatted information of appliance chain P3, and is even associated with such formatted information. In the foregoing, the processing of an image was considered; it is also possible to consider that the image is located in a file P57, together with identifier 60 or an index P52 and possibly the variable characteristics 66 of the capture appliance and of any appliance that may have been involved in processing of the image registered in the file; it may also be considered that the image is located in an image file P58, together with part of the formatted information. By extension, the invention is therefore equally applicable to the case in which the image as well as the formatted information is in database 22.

The value of the variable characteristics 66 can be determined by means of information contained in file P57 or image file P58. Preferably, this information will be registered in the file in a standard format such as that of the EXIF standard known in the art. In this way, the system and the method of the invention are applicable to the processing of images that have been filmed and/or have already been processed by means of appliances that were commercialized before the formatted information corresponding to such appliances was established.

It is quite evident that modification of the quality of the image can be simplified by taking into account only the defects of a limited number of appliances of the chain, or even of a single appliance, and by correcting only those defects.

Furthermore, as was already envisioned in the description of FIG. 13a, the method of the invention may be applied by simulating appliances other than those constituting part of the appliance chain P3 being used. Likewise, formatted information related to an appliance or to a type of appliances may be applicable to another appliance or to another type of appliance, especially similar appliances. For example, as illustrated in FIG. 16.6, there is illustrated a plurality of lots 710.0, 710.1, 710.2 of appliances. The formatted information concerns one type of appliance 711, but this formatted information may also be applicable to a similar appliance 712, thus making it permissible, for example, to produce only the formatted information related to a single appliance of each type.

The invention is applicable to the modification, and in particular to the improvement, of images processed or provided by an appliance or an appliance chain P3. An interesting application will be to modify only the defects or part of the defects of only certain appliances. One application may be to modify a defect only partly, in order, for example, to establish a compromise between image quality and calculation time.

Another object is application of the invention to machines for processing images in such a way as to induce defects, to impart a particular style to the image or to simulate the presentation of an appliance, defined as reference appliance, or an appliance chain P3, defined as reference appliance chain, other than those used in the scope of the application.

The invention is applicable to the design of integrated photo-development laboratories. It can be employed on a computer.

Finally, it can be employed in projectors, in which case it permits different corrections to be made, including the parallax correction that is common in the art of projection. For this purpose, a camera or a photo appliance can be used to capture a test pattern projected onto the screen.

Other examples of appliance chains can include:
computer camera (WEBCAM in English),
scanner,
digital photo appliance,
video camera,
printer,
screen,
projector,
games,
image-processing software,
teleconferencing system,
surveillance camera.

The following examples constitute appliance chains:
a single appliance,
an image-capture appliance and an image-restitution appliance,
a photo appliance, a scanner or a printer, for example in a photo-printing Minilab,
a digital photo appliance or a printer, for example in a photo-printing Minilab,
a scanner, a screen or a printer, for example in a computer,
a screen or projector, and the eye of a human being,
one appliance and another appliance which it is hoped can be emulated,
a photo appliance and a scanner,
an image-capture appliance and image-processing software,
image-processing software and an image-restitution appliance,
a combination of the preceding examples,
another set of appliances.

The said method may be employed in different forms:
operating system,
extension of processing software, such as that known by the trademark "PHOTOSHOP",
embedded software,
integrated electronic components,
services on the Internet,
or any combination of these forms of employment, etc.

Color Image

Referring in particular to FIG. 18, a description will now be given of the concept of color image P21, of color plane P20, of specified color P22, and of data P23 related to a specified color. The alternative embodiment described hereinafter is applicable to the case in which image P2 is a color image P21. Color image P21 can be decomposed into color planes P20 in various ways: number of planes (1, 3 or more), precision (8 bits unsigned, 16 bits signed, floating, etc.) and significance of the planes (relative to a standard color space).

Color image P21 can be decomposed in various ways into color planes P20: red, green, blue (RGB) or brightness, saturation, hue, etc.; on the other hand, color spaces such as PIM exist, or negative pixel values are possible in order to permit representation of subtractive colors, which cannot be represented in positive RGB; finally, it is possible to encode a pixel value on 8 bits or 16 bits, or by using floating values. The formatted information 15 includes data with which image P2 can be decomposed into color planes P20 compatible with the different defects P5 to be processed; each color plane being characterized by a specified color P22; the said formatted information 15 containing data P23 related to the said specified color, examples being coordinates in standard CIE or XYZ or LAB or sRGB color space; the said data P23 related to the said specified color making it possible to calculate the color plane P20 of image 1 and to determine the fraction of the said formatted information 15 that can be employed appropriately to modify the quality of the said color plane P20.

In the case of an appliance that is compatible with the PIM standard, it is possible, for example, to choose to work in positive color on 8 bits in X, Y, Z space or to work on 16 bits signed in RGB space.

Measured Formatted Information, Extended Formatted Information

The formatted information 15 or a fraction of the formatted information 15 can include measured formatted information P101 to illustrate a raw measurement, such as a mathematical field related to geometric distortion defects at a certain number of characteristic points of an array 80. The formatted information 15 or a fraction of the formatted information 15 can include extended formatted information P102, which can be calculated from measured formatted information P101, for example by interpolation for real points other than the characteristic points of array 80. In the foregoing, it has been seen that a formatted information item 15 might depend on variable characteristics 66. According to the invention, a combination P120 is defined as a combination composed of variable characteristics 66 and of values of variable characteristics, an example being a combination P120 composed of the focal length, of the focusing, of the diaphragm aperture, of the capture speed, of the aperture, etc. and of associated values. It is difficult to imagine how the formatted information 15 related to different combinations P120 can be calculated, all the more so because certain characteristics of combination P120, such as the focal length and the distance, can vary continuously.

The invention provides for calculating the formatted information 15 in the form of extended formatted information P102 by interpolation from measured formatted information P101 related to a predetermined selection of combinations P120 of known variable characteristics 66.

For example, measured formatted information P101 related to the combination P120 of "focal length=2, distance=7, capture speed=1/100", to the combination of "focal length=10, distance=7, capture speed=1/100" and to the combination of "focal length=50, distance=7, capture speed=1/100" is used to calculate extended formatted information P102 that depends on focal length as the variable characteristic 66. By means of this extended formatted information P102, it is possible in particular to determine formatted information related to the combination of "focal length=25, distance=7 and capture speed=1/100".

The measured formatted information P101 and the extended formatted information P102 may exhibit an interpolation deviation P121. The invention may include the stage of selecting zero or one or more variable characteristics 66, such that interpolation deviation P121 for the extended formatted information P102 obtained for the variable characteristics 66 selected in this way is smaller than a predetermined interpolation threshold. In fact, certain variable characteristics 66 may have a smaller influence than others on the defect P5, and the error introduced by making the approximation that these are constant may merely be minimum; for example, the focusing adjustment may have merely a slight influence on the vignetting defect, and for this reason may not be part of the variable characteristics 66 selected. The variable characteristics 66 may be selected at the moment of production of the formatted information 15. It results from the combination of technical features that the modification of image quality employs simple calculations. It also results from the combination of technical features that the extended formatted information P102 is compact. It also results from the combination of technical features that the eliminated variable characteristics 66 have the least influence on the defect P5. It results from the combination of technical features that image quality can be modified with specified precision by means of the formatted information 15.

Application of the Invention to Cost Reduction

Cost reduction is defined as a method and system for lowering the cost of an appliance or of an appliance chain P3, especially the cost of the optical system of an appliance or of an appliance chain, the method consisting in:
  reducing the number of lenses, and/or
  simplifying the shape of the lenses, and/or
  designing an optical system having defects P5 that are larger than those desired for the appliance or the appliance chain, or choosing the same from a catalog, and/or
  using materials, components, processing operations or manufacturing methods that are less costly for the appliance or the appliance chain and that add defects P5.

The method and system according to the invention can be used to lower the cost of an appliance or of an appliance chain: it is possible to design a digital optical system, to produce formatted information 15 related to the defects P5 of the appliance or of the appliance chain, to use this formatted information to enable image-processing means, whether they are integrated or not, to modify the quality of images derived from or addressed to the appliance or to the appliance chain, in such a way that the combination of the appliance or the appliance chain with the image-processing means is capable of capturing, modifying or restituting images of the desired quality at reduced cost.

The invention claimed is:

1. A method of modifying digital image data associated with an imaging appliance chain, the appliance chain including at least one device exhibiting at least one defect that can be characterized by formatted information, the method comprising:
  retrieving, from the digital image data, by an image processing apparatus, identifier information for each device within the appliance chain and variable characteristic information for the at least one device, wherein the identifier information is used by the image processing apparatus to determine devices within the appliance chain, and wherein the variable characteristic information represents at least one setting of the at least one device made during capture of the digital image data;

searching, based upon the identifier information and the variable characteristic information, in a computer-readable storage medium, for at least one compiled directory of formatted information related to a plurality of device models and organized by device model, wherein the at least one compiled directory includes first formatted information related to a device model of the same model as the at least one device that is generated by calibrating the device model of the same model as the at least one device based upon characteristics of the device model of the same model as the at least one device, and second formatted information derived directly from the first formatted information without further calibration, wherein the first formatted information and second formatted information include the same items of data in the same format;

retrieving, based upon the search, either the first formatted or second formatted information as specific formatted information, wherein the specific formatted information is associated, at least in part, with the identifier information and the variable characteristic information, and wherein the specific formatted information is related, at least in part, to the at least one defect of the at least one device; and modifying the digital image data by the image processing apparatus to correct for the at least one defect using the specific formatted information.

2. The method according to claim 1, wherein the at least one device is selected from the group of: a photographic appliance, a camera, a camera body, a lens, a video camera, a camera connected to or integrated in a PC, a camera connected to or integrated in a personal digital assistant, a camera connected to or integrated in a telephone, a videoconferencing appliance and a measuring camera.

3. The method according to claim 1, wherein the variable characteristic information comprises one or more of: a focal length of an optical system, a redimensioning applied to an image, a nonlinear brightness correction, a gamma correction, an enhancement of an image contour, a level of deblurring applied by the one appliance, an image noise characteristic of a sensor or an electronic device, an aperture of an optical system, a focusing distance, a number of frames in a film, an underexposure, an overexposure, a sensitivity of a film or sensor, a type of paper used in a printer, a position of a center of a sensor, a rotation of an image relative to a sensor, a position of a projector relative to a screen, a white balance, an activation of a flash, a flash power, an exposure time, a sensor gain, a compression factor, an image contrast, and another image related adjustment, and an adjusted mode of operation.

4. The method according to claim 1, wherein the at least one defect is related to one or more of: a distortion, a blurring, a vignetting, a chromatic aberration, a rendering of colors, a flash uniformity, a sensor noise, a grain, an astigmatism, and a spherical aberration.

5. A system for modifying digital image data associated with an imaging appliance chain, the appliance chain including at least one device exhibiting at least one defect that can be characterized by formatted information, the system comprising:

an image processing apparatus; and a computer-readable storage medium storing instructions that, when executed by the image processing apparatus, perform the steps of:

retrieving, from the digital image data, by an image processing apparatus, identifier information for each device within the appliance chain and variable characteristic information for the at least one device, wherein the identifier information is used by the image processing apparatus to determine devices within the appliance chain, and wherein the variable characteristic information represents at least one setting of the at least one device made during capture of the digital image data;

searching, based upon the identifier information and the variable characteristic information, in a computer-readable storage medium, for at least one compiled directory of formatted information related to a plurality of device models and organized by device model, wherein the at least one compiled directory includes first formatted information related to a device model of the same model as the at least one device that is generated by calibrating the device model of the same model as the at least one device based upon characteristics of the device model of the same model as the at least one device, and second formatted information derived directly from the first formatted information without further calibration, wherein the first formatted information and second formatted information include the same items of data in the same format;

retrieving, based upon the search, either the first formatted or second formatted information as specific formatted information, wherein the specific formatted information is associated, at least in part, with the identifier information and the variable characteristic information, and wherein the specific formatted information is related, at least in part, to the at least one defect of the at least one device; and modifying the digital image data by the image processing apparatus to correct for the at least one defect using the specific formatted information.

6. The system according to claim 5, wherein the at least one device is selected from the group of: a photographic appliance, a camera, a camera body, a lens, a video camera, a camera connected to or integrated in a PC, a camera connected to or integrated in a personal digital assistant, a camera connected to and integrated in a telephone, a videoconferencing appliance or a measuring camera.

7. The system according to claim 5, wherein the variable characteristic information comprises one or more of: a focal length of an optical system, a redimensioning applied to an image, a nonlinear brightness correction, a gamma correction, an enhancement of an image contour, a level of deblurring applied by the one appliance, an image noise characteristic of a sensor or an electronic device, an aperture of an optical system, a focusing distance, a number of frames in a film, an underexposure, an overexposure, a sensitivity of a film or sensor, a type of paper used in a printer, a position of a center of a sensor, a rotation of an image relative to a sensor, a position of a projector relative to a screen, a white balance, an activation of a flash, a flash power, an exposure time, a sensor gain, a compression factor, an image contrast, and another image related adjustment, and an adjusted mode of operation.

8. The system according to claim 5, wherein the at least one defect is related to one or more of: a distortion, a blurring, a vignetting, a chromatic aberration, a rendering of colors, a flash uniformity, a sensor noise, a grain, an astigmatism, and a spherical aberration.

9. A non-transitory physical computer-readable storage medium for storing instructions for modifying digital image data associated with an imaging appliance chain, the appliance chain including at least one device exhibiting at least one defect that can be characterized by formatted information, the computer-readable storage medium comprising one or more individual media and storing instructions that, when executed by an image processing apparatus, perform the steps of:

retrieving, from the digital image data, by an image processing apparatus, identifier information for each device within the appliance chain and variable characteristic information for the at least one device, wherein the identifier information is used by the image processing apparatus to determine devices within the appliance chain, and wherein the variable characteristic information represents at least one setting of the at least one device made during capture of the digital image data;

searching, based upon the identifier information and the variable characteristic information, in a computer-readable storage medium, for at least one compiled directory of formatted information related to a plurality of device models and organized by device model, wherein the at least one compiled directory includes first formatted information related to a device model of the same model as the at least one device that is generated by calibrating the device model of the same model as the at least one device based upon characteristics of the device model of the same model as the at least one device, and second formatted information derived directly from the first formatted information without further calibration, wherein the first formatted information and second formatted information include the same items of data in the same format;

retrieving, based upon the search, either the formatted or second formatted information as specific formatted information, wherein the specific formatted information is associated, at least in part, with the identifier information and the variable characteristic information, and wherein the specific formatted information is related, at least in part, to the at least one defect of the at least one device; and modifying the digital image data by the image processing apparatus to correct for the at least one defect using the specific formatted information.

10. The non-transitory physical computer-readable storage medium according to claim 9, wherein the at least one device is selected from the group of: a photographic appliance, a camera, a camera body, a lens, a video camera, a camera connected to or integrated in a PC, a camera connected to or integrated in a personal digital assistant, a camera connected to or integrated in a telephone, a videoconferencing appliance and a measuring camera.

11. The non-transitory physical computer-readable storage medium according to claim 9, wherein the variable characteristic information comprises one or more of: a focal length of an optical system, a redimensioning applied to an image, a nonlinear brightness correction, a gamma correction, an enhancement of an image contour, a level of deblurring applied by the one appliance, an image noise characteristic of a sensor or an electronic device, an aperture of an optical system, a focusing distance, a number of frames in a film, an underexposure, an overexposure, a sensitivity of a film or sensor, a type of paper used in a printer, a position of a center of a sensor, a rotation of an image relative to a sensor, a position of a projector relative to a screen, a white balance, an activation of a flash, a flash power, an exposure time, a sensor gain, a compression factor, an image contrast, and another image related adjustment, and an adjusted mode of operation.

12. The non-transitory physical computer-readable storage medium according to claim 9, wherein the at least one defect is related to one or more of: a distortion, a blurring, a vignetting, a chromatic aberration, a rendering of colors, a flash uniformity, a sensor noise, a grain, an astigmatism, and a spherical aberration.

* * * * *